US010216684B2

(12) United States Patent
Roberts-Hoffman et al.

(10) Patent No.: US 10,216,684 B2
(45) Date of Patent: Feb. 26, 2019

(54) OPERATING SYSTEM CARD FOR MULTIPLE DEVICES

(71) Applicant: Google LLC, Mountain View, CA (US)

(72) Inventors: Katie Leah Roberts-Hoffman, San Jose, CA (US); Alberto Martin Perez, Los Altos, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/824,456

(22) Filed: Nov. 28, 2017

(65) Prior Publication Data
US 2018/0089134 A1   Mar. 29, 2018

Related U.S. Application Data

(63) Continuation of application No. 14/746,361, filed on Jun. 22, 2015, now Pat. No. 9,858,231.

(51) Int. Cl.
*G06F 13/40* (2006.01)
*G11C 7/10* (2006.01)
(Continued)

(52) U.S. Cl.
CPC ........ *G06F 13/4081* (2013.01); *G06F 1/1605* (2013.01); *G06F 1/1613* (2013.01);
(Continued)

(58) Field of Classification Search
None
See application file for complete search history.

(56) References Cited

U.S. PATENT DOCUMENTS

| 4,941,841 A | 7/1990 | Darden et al. |
| 5,297,272 A | 3/1994 | Lu et al. |

(Continued)

FOREIGN PATENT DOCUMENTS

| EP | 1727019 A1 * | 11/2006 | ......... B60R 11/0252 |
| WO | 9400970 A1 | 1/1994 | |
| WO | 2016209768 A1 | 12/2016 | |

OTHER PUBLICATIONS

'Desktop Computer PCMIA CardBus PC Card Reader / Writer (Adapter, Socket Controller); Drives Bay or External Mounting' by Amtron, archived on Mar. 24, 2017.*

(Continued)

*Primary Examiner* — Steven G Snyder
(74) *Attorney, Agent, or Firm* — Brake Hughes Bellermann LLP

(57) ABSTRACT

In one general aspect, a main printed circuit board (PCB) card can include a System on a Chip (SoC) configured to run an operating system stored on the main PCB card, at least one dynamic random access memory (DRAM) device and at least one non-volatile memory device each configured for use by the SoC, and at least one connector. The main PCB card can be configured to be interchangeably interfaced with multiple types of shell computing devices by way of a slot included in a shell computing device. The slot can be configured to accommodate the main PCB card. Each type of shell computing device can be of a different form factor. Each form factor can be representative of a different type of computing device. The at least one connector can be configured to be plugged into a mating connector included in a shell computing device.

20 Claims, 13 Drawing Sheets

(51) Int. Cl.
*G06F 21/71* (2013.01)
*G06F 12/02* (2006.01)
*G06F 13/42* (2006.01)
*G06F 13/38* (2006.01)
*G06F 1/16* (2006.01)

(52) U.S. Cl.
CPC .......... *G06F 1/1616* (2013.01); *G06F 1/1632* (2013.01); *G06F 12/0246* (2013.01); *G06F 13/382* (2013.01); *G06F 13/4282* (2013.01); *G06F 21/71* (2013.01); *G11C 7/1072* (2013.01); *G06F 2212/7201* (2013.01)

(56) References Cited

U.S. PATENT DOCUMENTS

| | | | |
|---|---|---|---|
| 5,628,031 A | 5/1997 | Kikinis et al. | |
| 5,708,853 A * | 1/1998 | Sanemitsu | G06F 1/1616 348/376 |
| 5,748,912 A | 5/1998 | Lee et al. | |
| 5,887,145 A | 3/1999 | Harari et al. | |
| 5,948,047 A | 9/1999 | Jenkins et al. | |
| 5,987,553 A | 11/1999 | Swamy et al. | |
| 5,999,952 A | 12/1999 | Jenkins et al. | |
| 6,029,183 A | 2/2000 | Jenkins et al. | |
| 6,065,679 A | 5/2000 | Levie et al. | |
| 6,108,732 A | 8/2000 | Klein et al. | |
| 6,311,268 B1 | 10/2001 | Chu et al. | |
| 6,615,404 B1 | 9/2003 | Garfunkel et al. | |
| 6,636,918 B1 | 10/2003 | Aguilar et al. | |
| 7,334,735 B1 * | 2/2008 | Antebi | G01S 5/22 235/492 |
| 7,533,408 B1 | 5/2009 | Arnouse et al. | |
| 7,593,723 B2 | 9/2009 | Zarom | |
| 7,676,624 B2 | 3/2010 | Chu et al. | |
| 7,818,487 B2 | 10/2010 | Chu et al. | |
| 7,836,237 B2 | 11/2010 | Lien et al. | |
| 7,990,724 B2 | 8/2011 | Juhasz et al. | |
| RE42,814 E | 10/2011 | Chu et al. | |
| 8,041,873 B2 | 10/2011 | Chu et al. | |
| RE42,984 E | 11/2011 | Chu et al. | |
| RE43,119 E | 1/2012 | Chu et al. | |
| RE43,171 E | 2/2012 | Chu et al. | |
| 8,234,436 B2 | 7/2012 | Chu et al. | |
| RE43,602 E | 8/2012 | Chu et al. | |
| RE44,468 E | 8/2013 | Chu et al. | |
| RE44,654 E | 12/2013 | Chu et al. | |
| RE44,739 E | 1/2014 | Chu et al. | |
| 8,626,977 B2 | 1/2014 | Chu et al. | |
| 8,725,205 B2 | 5/2014 | Ryan | |
| RE44,933 E | 6/2014 | Chu et al. | |
| 8,756,359 B2 | 6/2014 | Chu et al. | |
| RE45,140 E | 9/2014 | Chu et al. | |
| 8,977,797 B2 | 3/2015 | Chu et al. | |
| 9,083,812 B2 | 7/2015 | Ryan | |
| 9,529,768 B2 | 12/2016 | Chu et al. | |
| 9,529,769 B2 | 12/2016 | Chu et al. | |
| 9,690,729 B2 * | 6/2017 | Jolda | G06F 13/36 |
| 2004/0193764 A1 | 9/2004 | Watanabe et al. | |
| 2005/0174729 A1 * | 8/2005 | Chu | G06F 1/12 361/679.08 |
| 2008/0158805 A1 | 7/2008 | El et al. | |
| 2008/0259551 A1 | 10/2008 | Gavenda | |
| 2010/0099308 A1 | 4/2010 | Busse et al. | |
| 2011/0256905 A1 * | 10/2011 | Ryan | G06F 1/1632 455/556.1 |
| 2012/0151098 A1 * | 6/2012 | Sullivan | G06F 1/1607 710/13 |
| 2012/0188698 A1 * | 7/2012 | Chen | G06F 1/1632 361/679.21 |
| 2013/0109202 A1 | 5/2013 | Szczesny et al. | |
| 2014/0223065 A1 * | 8/2014 | Jolda | G06F 13/36 710/303 |
| 2016/0050071 A1 * | 2/2016 | Collart | G06F 21/57 713/193 |
| 2016/0371218 A1 | 12/2016 | Katie et al. | |
| 2017/0192928 A1 | 7/2017 | Arnouse | |
| 2017/0228339 A1 * | 8/2017 | Shao | G06F 1/185 |

OTHER PUBLICATIONS promos.asus.com, "Asus Chromebox Experience the Best Chrome OS Desktop", retrieved on Jun. 13, 2015 from <http://promos.asus.com/us/chromeos/chromebox/>, 5 pages.
Jr Raphael, Computerworld, "In depth: What Asus's $179 Chromebox is actually like to use", retrieved on Jun. 13, 2015 from <http://www.computerworld.com/article/2475973/cloud-computing/in-depth-what-asus-s--179-chromebox-is-actually-like-to-use.html>, Mar. 12, 2014, 10 pages.
International Search Report and Written Opinion for PCT Application No. PCT/US2016/038362, dated Sep. 9, 2016, 9 pages.
Bouc, "Motorola Project Ara Customization by Consumer", retrieved on May 13, 2015 from http://guardianlv.com/2013/10/motorola-project-ara-customization-by-consumer/, Oct. 28, 2013, 4 pages.
"Universal Serial Bus Type-C Cable and Connector Specification"; Revision 1.2; Mar. 25, 2016.
VESA Brings DisplayPort to New USB Type-C Connector from displayport.org; Sep. 22, 2014.
"PCI Express", from Wikipedia, the free encyclopedia, retrieved on May 13, 2015 from http://en.wikipedia.org/wiki/PCI_Express, 22 pages.
"USB", from Wikipedia, the free encyclopedia, retrieved on May 13, 2015 from http://en.wikipedia.org/wiki/USB#USB_3.1, 21 pages.
"VESA DisplayPort Alt Mode for USB Type—C Standard", "VESA DisplayPort Alt Mode for USB Type—C Standard", Feature Summary, Sep. 22, 2014, 17 pages., Sep. 22, 2014, 17.
Baxter, "SSD vs HDD", Storage Reviews, archived Jun. 13, 2014.
Sanam Shahla Rizvi, et al, "Flash SSD vs HDD: High Performance Oriented Modem Embedded and Multimedia Storage Systems", IEEE, copyright 2010.

* cited by examiner

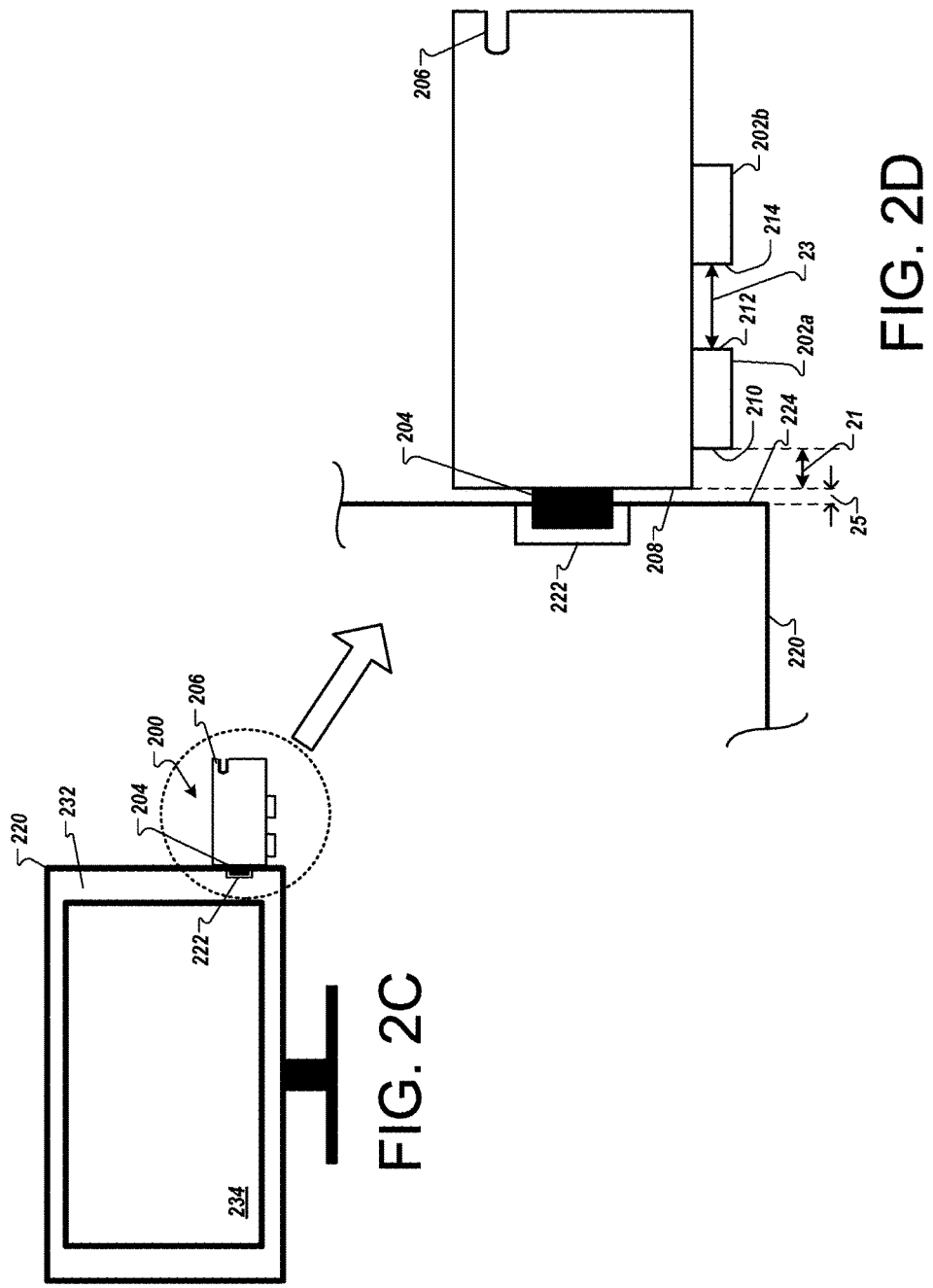

OPERATING SYSTEM CARD FOR MULTIPLE DEVICES

CROSS-REFERENCE TO RELATED APPLICATIONS

This application is a continuation of, and claims priority under 35 U.S.C. § 120 to, U.S. application Ser. No. 14/746,361, filed on Jun. 22, 2015, and entitled "OPERATING SYSTEM CARD FOR MULTIPLE DEVICES", the contents of which are hereby incorporated by reference.

TECHNICAL FIELD

This description generally relates an operating system card that can be connected to various different types of devices.

BACKGROUND

The inclusion of many storage devices, input devices, output devices, sensors and other types of hardware peripheral devices included in a computing device can affect the overall cost and performance of the computing device. The peripheral devices can be connected to a main printed circuit board (PCB) that can include a central processing unit, memory and other circuitry and devices that can interface to and control the peripheral devices. The type and number of peripheral devices connected to (interfaced to) the main PCB can be dependent on the type of computing device being built or created. The types of computing devices can include, but are not limited to, a laptop computer, a tablet computer, a smartphone, a television, a notebook computer, and a digital frame. The peripheral devices can be connected to the main PCB using one or more types of connections and connectors that can include, but are not limited to, extension connectors (e.g., bridges), M.2 board-to-board connectors, and flex connectors.

SUMMARY

In one general aspect, a main printed circuit board (PCB) card can include a System on a Chip (SoC) configured to run an operating system (OS) stored on the main PCB card, at least one dynamic random access memory (DRAM) device configured for use by the SoC, at least one non-volatile memory device configured for use by the SoC, and at least one connector. The main PCB card can be configured to be interchangeably interfaced with multiple types of shell computing devices by way of a slot included in a shell computing device. The slot can be configured to accommodate the main PCB card. Each type of shell computing device can be of a different form factor. Each form factor can be representative of a different type of computing device. The at least one connector can be configured to be plugged into a mating connector included in a shell computing device.

Example implementations may include one or more of the following features. For instance, the multiple types of shell computing devices can include a shell laptop computing device, a shell tablet computing device, a shell smartphone device, a shell display device, a shell notebook computing device, a television, a monitor, and a shell digital frame device. The main PCB card can further include a WiFi communication module configured to allow each of the multiple types of shell computing devices to communicate wirelessly with a network. A height of the main PCB card can be determined based on one or more of a height of the SoC, a height of the at least one DRAM device, and a height of the at least one non-volatile memory device. The connector can include a plurality of fingers, each finger being configured to provide and/or receive an electrical signal. The connector can be a Universal Serial Bus (USB) C-type connector. The connector can be configured to support a DisplayPort (DP) digital display interface, a USB interface, and a power interface. The main PCB card can further include a security module including a dedicated processor for use in providing security and authentication support for use by the shell computing device. The SoC can include at least one processing device for use as a central processing unit (CPU) for the main PCB card. The mating connector can be included in the shell computing device such that plugging the at least one connector of the main PCB card into the mating connector results in the main PCB card being included inside of the shell computing device. The main PCB card can be included in an enclosure including an interface connector including a first connector and a second connector, the at least one connector mated to the first connector, and the second connector configured to be mated with the mating connector included in the shell computing device. The mating connector can be included in the shell computing device such that plugging the at least one connector of the main PCB card into the mating connector includes plugging the second connector into the mating connector included in the shell computing device, the enclosure including the main PCB card being located external to the shell computing device. The enclosure can include at least one communication connector.

In another general aspect, a system can include a main printed circuit board (PCB) card configured to be interchangeably interfaced with multiple types of shell computing devices. Each type of shell computing device can be of a different form factor. Each form factor can be representative of a different type of computing device. The main PCB card can include a System on a Chip (SoC) configured to run an operating system on the main PCB card, at least one dynamic random access memory (DRAM) device configured for use by the SoC, at least one non-volatile memory device configured for use by the SoC, and a card connector. The system can further include a shell computing device included in the multiple types of shell computing devices. The shell computing device can include a slot configured to accommodate the main PCB card allowing the main PCB card to be included inside of the shell computing device. The shell computing device can include a mating connector. The card connector can be configured to be plugged into the mating connector.

Example implementations may include one or more of the following features. For instance, the multiple types of shell computing devices can include a shell laptop computing device, a shell tablet computing device, a shell smartphone device, a shell display device, a shell notebook computing device, a television, a monitor, and a shell digital frame device. The card connector can include a plurality of fingers. Each finger being configured to provide and/or receive an electrical signal. The card connector can be a Universal Serial Bus (USB) C-type connector. The mating connector can be a Universal Serial Bus (USB) C-type receptacle.

In yet another general aspect, a method can include receiving, in a slot included in a first shell computing device of a first form factor representative of a first type of computing device, a main printed circuit board (PCB) card including a System on a Chip (SoC) configured to run an operating system (OS) in the first shell computing device, connecting the main PCB card to the first shell computing device, the connecting including mating a first connector included on the main PCB card with a second connector included in the first shell computing device, the mating resulting in the inclusion of the main PCB card in the first shell computing device, disconnecting the main PCB card from the first shell computing device, the disconnecting including un-mating the first connector included in the main PCB card from the second connector included in the first shell computing device, the un-mating resulting in a removal of the main PCB card from the first shell computing device, receiving the main PCB card in a slot included in a second shell computing device of a second form factor representative of a second type of computing device different from the first type of computing device, and connecting the main PCB card to the second shell computing device, the connecting including mating the first connector included in the main PCB card with a third connector included in the second shell computing device, the mating resulting in the inclusion of the main PCB card in the second shell computing device.

Example implementations may include one or more of the following features. For instance, the first shell computing device can be one of a shell laptop computing device, a shell tablet computing device, a shell smartphone device, a shell display device, a shell notebook computing device, a television, a monitor, and a shell digital frame device. The second shell computing device can be one of a shell laptop computing device, a shell tablet computing device, a shell smartphone device, a shell display device, a shell notebook computing device, a television, a monitor, and a shell digital frame device. The first connector can include a plurality of fingers. Each finger can be configured to provide and/or receive an electrical signal. The first connector can be a Universal Serial Bus (USB) C-type connector. The second connector and the third connector can be Universal Serial Bus (USB) C-type receptacles.

The details of one or more implementations are set forth in the accompanying drawings and the description below. Other features will be apparent from the description and drawings, and from the claims.

BRIEF DESCRIPTION OF THE DRAWINGS

FIG. 2C is a diagram of an example operating system dongle connected to a shell computing device using a connector.

FIG. 2D is a diagram that illustrates a detailed view of the example operating system dongle connected to a shell computing device using a connector as shown in FIG. 2C.

Like reference symbols in the various drawings indicate like elements.

DETAILED DESCRIPTION

Figure 1A:
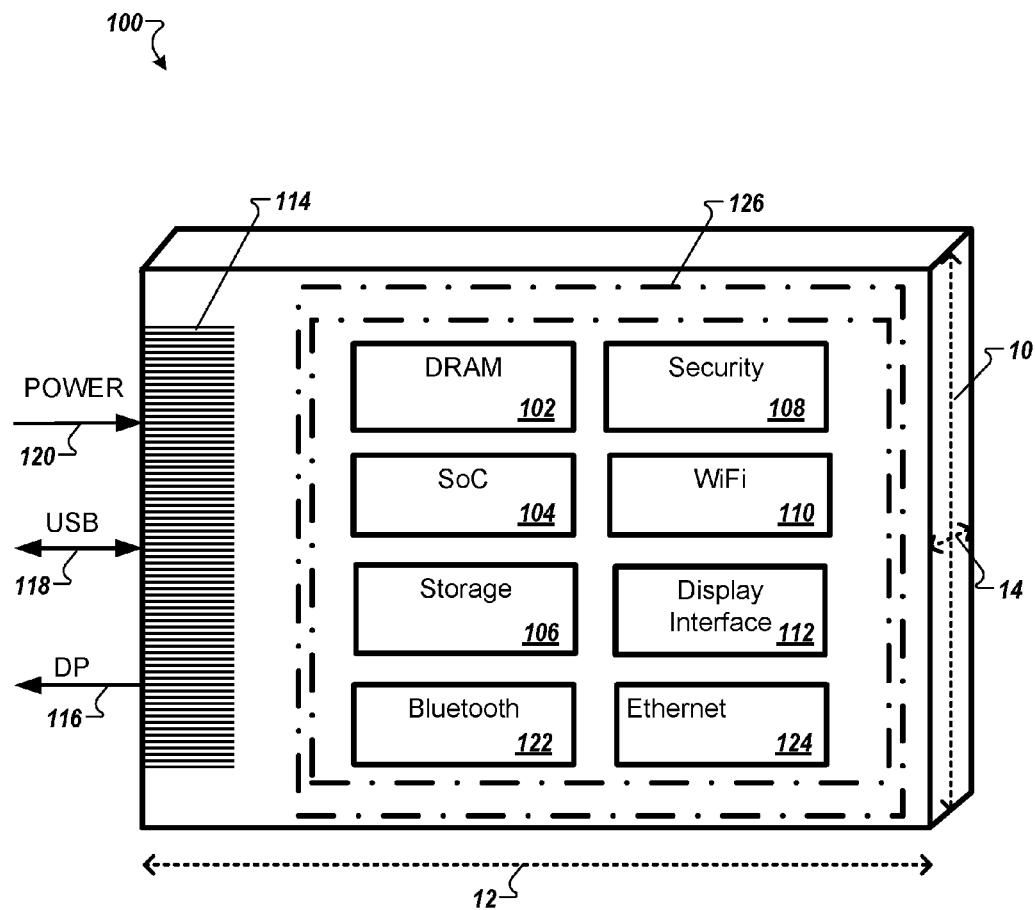
FIG. 1A is a diagram of an example main printed circuit board (PCB) card that includes a first type of connector.

The inclusion of many storage devices, input devices, output devices, sensors and other types of hardware peripheral devices in a computing device can affect the overall cost and performance of the computing device. The peripheral devices can be connected to a main printed circuit board (PCB) that can include, but is not limited to, a central processing unit (CPU), memory, communication controllers, and other circuitry and devices that can interface to and control one or more peripheral devices. The peripheral devices can be connected to the main PCB using one or more types of connections and connectors that can include, but are not limited to, extension connectors (e.g., bridges), M.2 board-to-board connectors, and flex connectors.

In many cases, the computing devices may use (or may be configured to use) the same main PCB. A user could leverage the use of a single main PCB in each computing device they may own or can access, each computing device being merely a shell computing device that can include one or more peripheral devices but that will not include a main PCB. Lacking a main PCB, the shell computing device may not be functional as it is lacking any main control or "brains" for it to fully function. A shell computing device can have the form factor (housing) of a computing device that includes one or more peripheral devices and a main PCB with the main PCB removed from the computing device and, in some implementations, an interface included for interfacing to a plug-in, interchangeable main PCB card, as will be described herein. A shell computing device, lacking a main PCB, can cost less than computing devices that include a main PCB. Using a single main PCB that can plug into or otherwise interface with multiple shell computing devices can not only leverage the cost of the main PCB among the computing devices but can also take advantage of the functionality and capabilities of a single main PCB that can be used in multiple shell computing devices.

In order to accomplish the use of a common main PCB in multiple computing devices, the main PCB can be included in a thin enclosure that can include one or more connectors that can be plugged into or interfaced with each shell computing device. The main PCB and its enclosure can be referred to as a main PCB card. The main PCB card can be plugged into or interfaced with any number of shell computing devices configured to accept the main PCB card. The shell computing device can include one or more peripheral devices but will not include (will lack) one or more devices common to other computing devices, such as a CPU, communication controller, and memory, components typically included in a main PCB of a computer. The main PCB card can include a CPU, communication controller, and memory that can be utilized by each shell computing device.

In addition, the main PCB card can include circuitry for controlling and interfacing with a USB connector using a USB protocol. For example, the main PCB card can include circuitry for interfacing to a USB connector that implements a specific USB protocol. The main PCB card can include the circuitry that can interface with a USB connector included on the main PCB card that can provide display control signals to a shell computing device, can communicate with the shell computing device using one or more types of USB communication protocols, and that can accept power signals from the shell computing device. Utilizing USB connectors that implement specific USB protocols takes advantage of a common standard for power delivery, display signals (e.g., video) and USB communications. For example, incorporating one or more USB C-type connectors and implementing a USB 3.1 (or USB 3.0) protocol on a main PCB card that can plug into (interface with) many different shell computing devices leverages the use of a common standard for power delivery, display signal data delivery, and communications.

FIG. 1A is a diagram of an example main PCB card 100 that includes a first type of connector (e.g., connector 114). The main PCB card 100 can be plugged into (interfaced with) a shell computing device for inclusion inside of the shell computing device. For example, the main PCB card 100 can be the size of a credit card. The main PCB card 100 includes dynamic random access memory (DRAM) 102, a System on a Chip (SoC) 104, storage 106, a security module 108, a WiFi communication module 110, and a display interface module 112. The main PCB card 100 can run an operating system (OS) included in (embedded in) the main PCB card 100.

For example, the connector 114 can include fingers. Each finger of the connector 114 can provide an electrical signal and/or receive an electrical signal. In some implementations, the fingers can include gold surfaces (e.g., gold fingers). The connector 114 can be a male connector that can be plugged into/mated with a female connector included in the shell computing device. An example of the main PCB card 100 plugged into (interfaced with) a shell computing device is shown with reference to FIGS. 6, 7, and 8.

In some implementations, a main PCB card can include more than the number of components and modules shown in the example main PCB card 100. In some implementations, a main PCB card can include less than the number of components and modules shown in the example main PCB card 100. In some implementations, a main PCB card can include components and modules that are different from the components and modules shown in the example main PCB card 100.

The SoC 104 can include a microcontroller, a microprocessor or a digital signal processor as the core processor for the SoC 104. The core SoC processor can be considered the CPU for the main PCB card 100 and for a shell computing device that incorporates the main PCB card 100. In some implementations, the SoC 104 may include more than one processor. In these implementations, the SoC 104 can be referred to as a multi-processor SoC (MPSoC). The SOC 104 can include a memory block that can include one or more of random access memory (RAM), read only memory (ROM), electrically erasable programmable read only memory (EEPROM), and flash memory.

The SoC 104 can include additional circuitry for use in operating the shell computing device it is plugged into or interfaced to. The additional circuitry can include, but is not limited to, oscillators, phase-lock loops, counter-timers, and real-time timers. The SoC 104 can include circuitry for power management of the shell computing device such as power-on reset generators and voltage regulators. The SoC 104 can include analog interfaces such as analog-to-digital converters (ADCs) and digital-to-analog converters (DACs). The SoC 104 can use the ADCs and the DACs when controlling peripheral devices included in the shell computing device.

The SoC 104 can include circuitry for managing external interfaces for the shell computing device. The external interfaces that the SoC 104 can manage can include, but are not limited to, Universal Serial Bus (USB), FireWire (IEEE 1394), universal asynchronous receiver/transmitter (UART), and serial peripheral interface (SPI). The UART can be used to wirelessly interface or connect the shell computing device including the main PCB card 100 to a cellular telecommunications network (a cellular data network).

The DRAM 102 can include one or more DRAM devices. The DRAM 102 can provide a main memory for the shell computing device. The DRAM 102 can be one or more forms of volatile memory. The DRAM 102 can be configured for use by the SoC 104. The DRAM 102 provide main memory for use by the OS running on the main PCB card 100.

The storage 106 can be one or more forms of non-volatile memory. The storage 106 can include one or more non-volatile memory devices. Non-limiting examples of the one or more non-volatile memory device can include ROM, Programmable ROM (PROM), EEPROM, ferroelectric RAM (F-RAM), and flash memory. The storage 106 can be configured for use by the SoC 104. For example, the storage 106 can provide persistent memory for the shell computing device and specifically for use by the OS running on the main PCB card 100.

The WiFi communication module 110 can allow the shell computing device to communicate wirelessly with a network or other computing device(s). For example, the shell computing device can wirelessly interface with/connect to a network or other computing device(s) using a WiFi (IEEE 802.11x) connection. The WiFi communication module 110 can interface with a WiFi antenna 126 included on the main PCB card 100 when providing the WiFi connection. In some implementations, a WiFi antenna may be included in the shell computing device (e.g., behind a display device included in the shell computing device) and may not be included on the main PCB card 100.

The security module 108 can be a dedicated processor that can provide security and authentication support for the use of the shell computing device. For example, the security module 108 can include a trusted platform module (TPM) that can securely generate cryptographic keys, and limit the use of secure keys. The security module 108 can include a random number generator. In some cases, software can use the security module 108 to authenticate the shell computing device that the main PCB card 100 is included in.

The display interface module 112 can provide display data (e.g., video data, image data, streaming audio and video data) to a display device or display monitor included in the shell computing device by way of the connector 114. For example, the display interface module 112 can provide display data for a DisplayPort (DP) digital display interface 116 supported by the connector 114. In some implementations, the SoC 104 can include the display interface module 112.

As described, the SoC 104 can include circuitry for managing a USB interface by providing and/or receiving data by way of a USB interface 118 supported by the connector 114. In a non-limiting example, the USB interface 118 can interface and communicate using one or more of USB 1.0, USB 1.1, USB 2.0, USB 3.0, USB 3.1 protocols. The SoC 104 can receive power from the shell computing device by way of a power interface 120 supported by the connector 114. The power can be used to supply power to the main PCB card 100.

The main PCB card 100 can include a Bluetooth communication module 122. The Bluetooth communication module 122 can be used to establish connections and communications between the shell computing device including the main PCB card 100 and one or more external networks and/or devices. The main PCB card 100 can include an Ethernet communication module 124. The Ethernet communication module 124 can be used to establish connections and communications between the shell computing device including the main PCB card 100 and one or more external networks and/or devices. In some implementations, the SoC 104 can include the Bluetooth communication module 122 and/or the Ethernet communication module 124.

In some implementations, the main PCB card 100 can include one or more additional components. Though not shown in FIG. 1A, for example, the main PCB card 100 can include a graphics processing unit (GPU). The GPU along with a microcontroller, a microprocessor or a digital signal processor included in the SoC 104 can be operatively configured to execute an operating system on the main PCB card 100. For example, the main PCB card 100 can include a video processing unit (VPU). The VPU along with a microcontroller, a microprocessor or a digital signal processor included in the SoC 104 can be operatively configured to execute an operating system on the main PCB card 100. In some implementations, the GPU and/or the VPU can be included in the SoC 104 resulting in a MPSoC.

For example, the main PCB card 100 can include the components and software needed to implement a gyroscope. For example, the main PCB card 100 can include the components and software needed to interface with a Global Positioning System (GPS). For example, the main PCB card 100 can include the components and software needed to implement one or more types of mobile telecommunication standards such as third generation (3G), fourth generation (4G), and long term evolution (LTE), and combinations thereof (e.g., 3G-LTE, 4G-LTE).

The connector 114 plugs into (interfaces with or mates with) a connector included in the shell computing device. The main PCB card 100 can have a width 10, a length 12, and a height (thickness) 14. For example, the height 14 of the main PCB card 100 can be determined based on a height of components included on the main PCB card 100. A component height can be defined as a distance from the PCB including the component to the top of the component when mounted on the PCB. For example, a height of the SoC 104, a height of DRAM components included in the DRAM 102, a height of memory components included in the storage 106, a height of components included in the security module 108, a height of components included in the WiFi communication module 110, a height of components included in the display interface module 112, a height of components included in the Bluetooth communication module 122, and a height of components included in the Ethernet communication module 124 can determine the height 14 of the main PCB card 100.

For example, in some implementations, the width 10 of the main PCB card 100 can be approximately 20 millimeters (mm) (between 15 mm and 25 mm). For example, the length 12 of the main PCB card 100 can be approximately 80 mm (e.g., between 75 mm and 85 mm). The height 14 of the main PCB card 100 can be approximately 4 mm (e.g., between 3.5 mm and 4.5 mm). For example, in some implementations, the width 10 of the main PCB card 100 can be approximately 40 mm (e.g., between 35 mm and 25 mm) and the length 12 of the main PCB card 100 can be approximately 40 mm (e.g., between 35 mm and 25 mm).

Figure 1B:
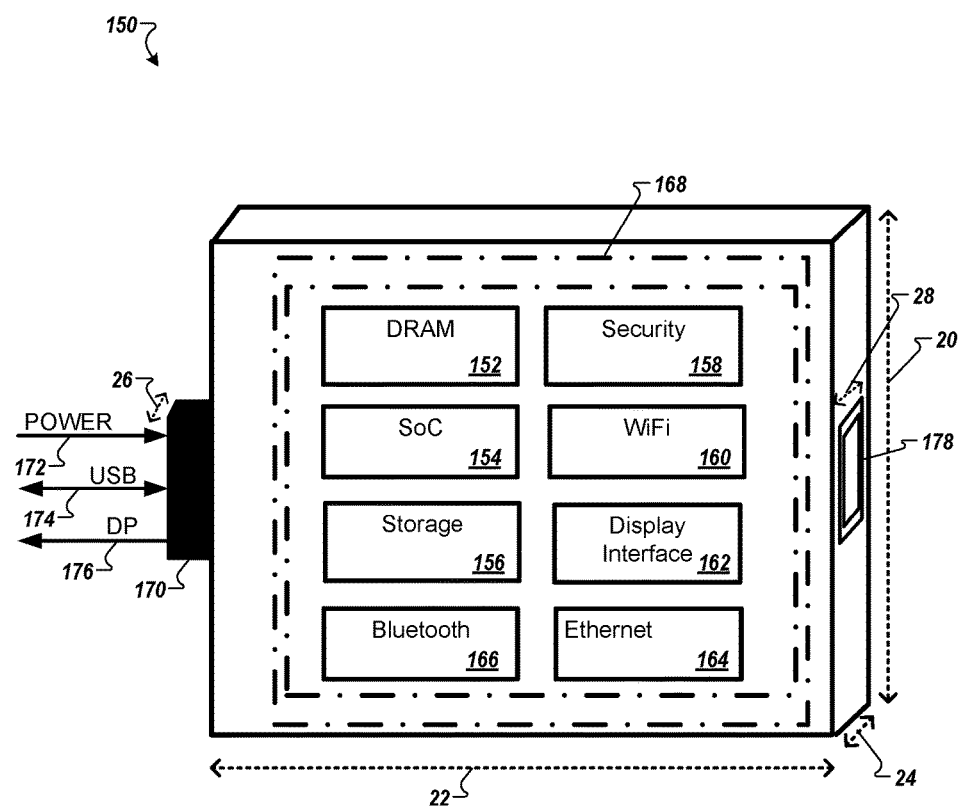
FIG. 1B is a diagram of an example main printed circuit board (PCB) card that includes a second type of connector.

FIG. 1B is a diagram of an example main PCB card 150 that includes a second type of connector (e.g., connector 170). The main PCB card 150 can function in a similar manner as the main PCB card 100 as shown in FIG. 1A. The main PCB card 150 can be plugged into (interfaced with) a shell computing device for inclusion inside of the shell computing device. For example, the main PCB card 150 can be the size of a credit card. The main PCB card 150 includes dynamic random access memory (DRAM) 152, a System on a Chip (SoC) 154, storage 156, a security module 158, a WiFi communication module 160, and a display interface module 162. The main PCB card 150 can run an operating system (OS) included in (embedded in) the main PCB card 150.

The main PCB card 150 includes connector 178. The connector 170 can be of a type that includes but is not limited to, USB A, USB B, micro-USB A, micro-USB B, micro-USB AB, USB five pin Mini-b, USB four pin Mini-b, USB 3.0 A, USB 3.0 B, USB 3.0 Micro B, and USB C. For example, the connector 114 can be a USB C-type connector (or receptacle). In some implementations, the connector 170 can be a USB C-type male connector. The connector 178 can be of a type that includes but is not limited to, USB A, USB B, micro-USB A, micro-USB B, micro-USB AB, USB five pin Mini-b, USB four pin Mini-b, USB 3.0 A, USB 3.0 B, USB 3.0 Micro B, and USB C. For example, the connector 178 can be a USB C-type connector (or receptacle). In some implementations, the connector 170 can be a USB C-type female connector.

In some implementations, a main PCB card can include more than the number of components and modules shown in the example main PCB card 150. In some implementations, a main PCB card can include less than the number of components and modules shown in the example main PCB card 150. In some implementations, a main PCB card can include components and modules that are different from the components and modules shown in the example main PCB card 150.

Referring to FIG. 1A, the SoC 154 can be similar to the SoC 104, and can function as described for the SoC 104. The SoC 154 can include a microcontroller, a microprocessor or a digital signal processor as the core processor for the SoC 104. The core SoC processor can be considered the CPU for the main PCB card 150 and for a shell computing device that incorporates the main PCB card 150. The SoC 154 can include circuitry for managing external interfaces for the shell computing device. The SoC 154 can be configured to manage a communications protocol for the connector 170 and the connector 178. In some implementations, the connector 170 can be a USB C-type connector and the connector 178 can be a USB C-type. In these implementations, the SoC 154 can be configured to provide USB 3.1 (or, in some cases USB 3.0) communications protocol support for the connector 170 and the connector 178.

Referring to FIG. 1A, the DRAM 152 can be similar to the DRAM 102, and can function as described for the DRAM 102. The DRAM 152 can provide a main memory for the shell computing device and for the OS running on the main PCB card 150.

Referring to FIG. 1A, the storage 156 can be similar to the storage 106, and can function as described for the storage 106. The storage 156 can be configured for use by the SoC 154 and specifically for use by the OS running on the main PCB card 150.

Referring to FIG. 1A, the WiFi communication module 160 can be similar to the WiFi communication module 110, and can function as described for the WiFi communication module 110. The WiFi communication module 160 can allow the shell computing device to communicate wirelessly with a network or other computing device(s). For example, the shell computing device can wirelessly interface with/ connect to a network or other computing device(s) using a WiFi (IEEE 802.11x) connection. The WiFi communication module 110 can interface with a WiFi antenna 168 included on the main PCB card 100 when providing the WiFi connection.

Referring to FIG. 1A, the security module 158 can be similar to the security module 108, and can function as described for the security module 108. In some cases, software can use the security module 158 to authenticate the shell computing device that the main PCB card 100 is included in.

Referring to FIG. 1A, the display interface module 162 can be similar to the display interface module 112, and can function as described for the display interface module 112. The display interface module 112 can provide display data (e.g., video data, image data, streaming audio and video data) to a display device or display monitor included in the shell computing device by way of the connector 170. For example, in implementations where the connector 170 is a USB C-type connector, the display interface module 162 can provide display data for a DisplayPort (DP) digital display interface 176 supported by the connector 170. For example, in implementations where the connector 178 is a USB C-type connector, the display interface module 162 can receive display data for a DisplayPort (DP) digital display interface supported by the connector 178. In some implementations, the SoC 154 can include the display interface module 162.

For example, the connector 178 can allow a user to connect an extension or peripheral device (e.g., a webcam) to the main PCB card 150 and therefore to a shell computing device. In some implementations, the connector 178 is a USB C-type connector utilizing a USB 3.1 protocol. In these implementations, a connection with a peripheral device by way of the connector 178 can support bandwidth and data transfer speeds needed to handle raw video data. For example, a user can implement a video chat using the shell computing device that includes the main PCB card 150.

As described, the SoC 154 can include circuitry for managing a USB interface by providing and/or receiving data by way of a USB interface 174 supported by the connector 170. In a non-limiting example, the USB interface 174 can interface and communicate using one or more of USB 1.0, USB 1.1, USB 2.0, USB 3.0, USB 3.1 protocols. The SoC 154 can receive power from the shell computing device by way of a power interface 120 supported by the connector 170. The power can be used to supply power to the main PCB card 150.

In addition or in the alternative, the SoC 154 can include circuitry for managing a USB interface by providing and/or receiving data by way of a USB interface supported by the connector 178. In a non-limiting example, the USB interface 174 can interface and communicate using one or more of USB 1.0, USB 1.1, USB 2.0, USB 3.0, USB 3.1 protocols. The SoC 154 can receive power from the shell computing device by way of a power interface 120 supported by the connector 170. The power can be used to supply power to the main PCB card 150.

Referring to FIG. 1A, the Bluetooth communication module 166 can be similar to the Bluetooth communication module 122, and can function as described for the Bluetooth communication module 122. The Bluetooth communication module 166 can be used to establish connections and communications between the shell computing device including the main PCB card 150 and one or more external networks and/or devices.

Referring to FIG. 1A, the Ethernet communication module 164 can be similar to the Ethernet communication module 124, and can function as described for the Ethernet communication module 124. The Ethernet communication module 164 can be used to establish connections and communications between the shell computing device including the main PCB card 150 and one or more external networks and/or devices. In some implementations, the SoC 104 can include the Bluetooth communication module 166 and/or the Ethernet communication module 164.

In some implementations, the main PCB card 150 can include one or more additional components similar to the additional components that may be included in the main PCB card 100 shown in FIG. 1A.

The connector 170 plugs into (interfaces with or mates with) a connector included in the shell computing device. For example, in implementations where the connector 170 is a USB C-type connector, the connector 170 can plug into (interface with) another USB C-type connector, leveraging the use of standard connectors.

The main PCB card 150 can have a width 20, a length 22, and a height (thickness) 24. In some implementations, the height 24 of the main PCB card 150 can be determined based on a height of components included on the main PCB card 150. For example, a height of the SoC 154, a height of DRAM components included in the DRAM 152, a height of memory components included in the storage 156, a height of components included in the security module 158, a height of components included in the WiFi communication module 160, a height of components included in the display interface module 162, a height of components included in the Bluetooth communication module 166, and a height of components included in the Ethernet communication module 164 can determine the height 24 of the main PCB card 150.

In some implementations, the height 24 can be determined based on a height 28 and/or a height 26 of the connector 178 and the connector 170, respectively.

For example, in some implementations, the width 20 of the main PCB card 150 can be approximately 20 millimeters (mm) (between 15 mm and 25 mm). For example, the length 22 of the main PCB card 150 can be approximately 80 mm (e.g., between 75 mm and 85 mm). The height 14 of the main PCB card 150 can be approximately 4 mm (e.g., between 3.5 mm and 4.5 mm). For example, in some implementations, the width 20 of the main PCB card 150 can be approximately 40 mm (e.g., between 35 mm and 25 mm) and the length 22 of the main PCB card 150 can be approximately 40 mm (e.g., between 35 mm and 25 mm).

Figure 2A:
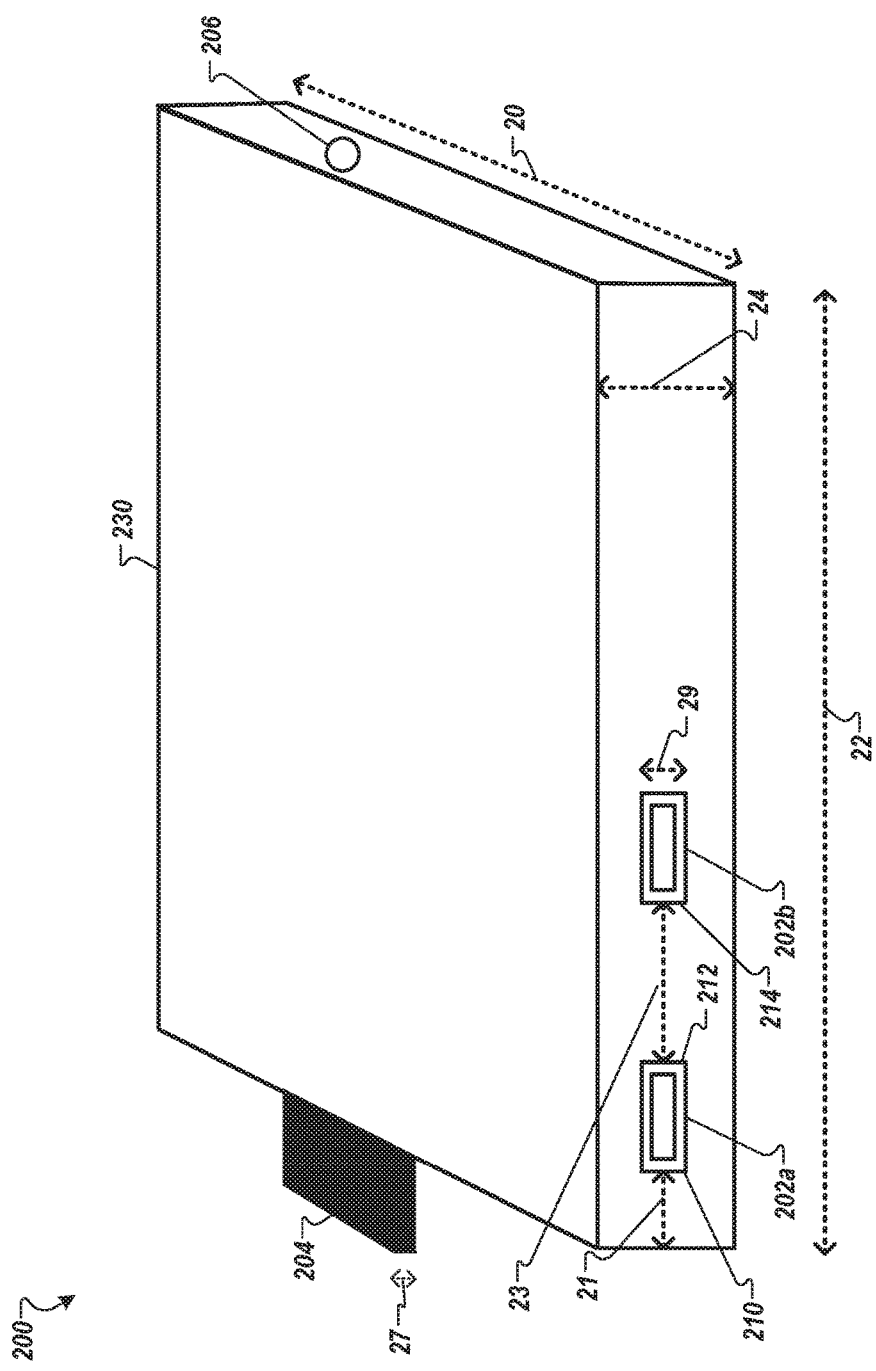
FIG. 2A is a diagram of an example operating system dongle that can include a full operating system on a small device that a user can easily carry.

FIG. 2A is a diagram of an example operating system (OS) dongle 200 that can include a full operating system on a small device that a user can easily carry. Referring to FIG. 1A, the OS dongle 200 can include the circuitry and components included on the main PCB card 100 in an enclosure 230 that forms the OS dongle 200. In addition, the OS dongle 200 includes communication connectors 202a-b, external connector 204, and power connector 206. An external source of power for the OS dongle 200 can be connected to the power connector 206 (power receptacle or power plug).

For example, in some implementations, a length 22 of the OS dongle 200 can be approximately 80 mm (e.g., between 75 mm and 85 mm). A width 20 of the OS dongle 200 can be approximately 55 mm (e.g., between 50 mm and 60 mm). A height 24 of the OS dongle 200 can be approximately 12 mm (between 7 mm and 17 mm). In some implementations, the height 24 of the OS dongle 200 can be dependent on a height 29 of communication connectors 202a-b (first communication connector 202a and second communication connector 202b) and/or a height 27 of the connector 204.

The OS dongle 200 can include circuitry for managing a USB interface by providing and/or receiving data by way of the connector 204. The USB interface can utilize one or more of USB 1.0, USB 1.1, USB 2.0, USB 3.0, USB 3.1 protocols. The OS dongle 200 can include circuitry for managing a display interface by providing display data to the connector 204. In some implementations, the display data can be for a DisplayPort (DP) digital display interface supported by the connector 204. In some implementations, the display data can be for a High-Definition Multimedia Interface (HDMI) port supported by the connector 204.

In some implementations, the communication connectors 202a-b can be the same type of connector. In some implementations, the first communication connector 202a can be a different type of connector than the second communication connector 202b. In some implementations, the communication connectors 202a-b can be connectors, receptacles, or ports. For example, the communication connectors 202a-b can be Universal Serial Bus (USB) connectors, receptacles, or ports. The USB type of connectors, receptacles or ports can include, but are not limited to, the following types: USB A, USB B, micro-USB A, micro-USB B, micro-USB AB, USB five pin Mini-b, USB four pin Mini-b, USB 3.0 A, USB 3.0 B, USB 3.0 Micro B, and USB C.

Figure 2B:
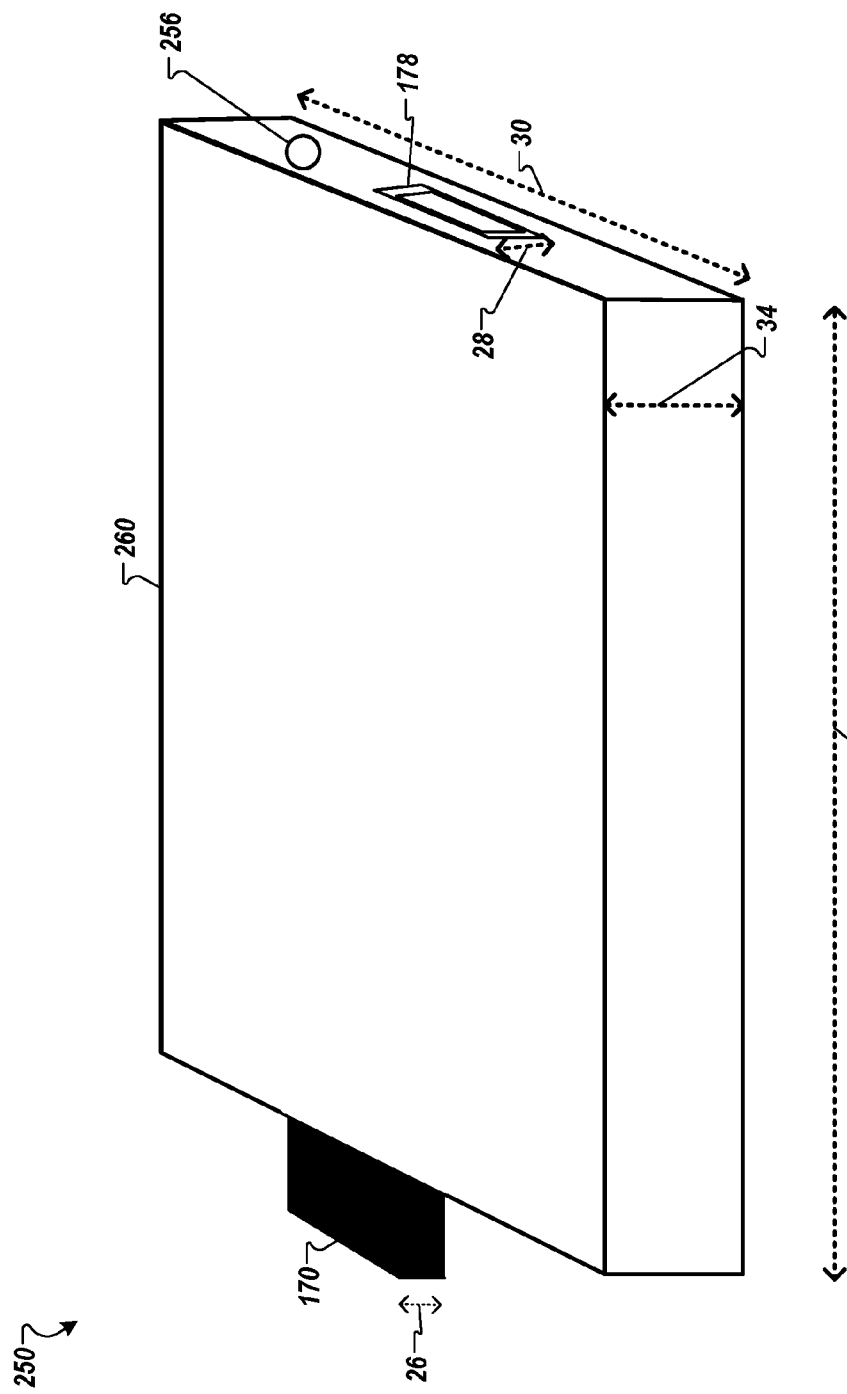
FIG. 2B is a diagram of an alternate example operating system (OS) dongle that can include a full operating system on a small device that a user can easily carry.

FIG. 2B is a diagram of an alternate example operating system (OS) dongle 250 that can include a full operating system on a small device that a user can easily carry. Referring to FIG. 1B, the OS dongle 250 can include the circuitry, components, and connectors included on the main PCB card 150 in an enclosure 260 that forms the OS dongle 250. In addition, the OS dongle 250 includes a power connector 256. Though not shown, the OS dongle 250 can include one or more communication connectors similar to the communication connectors 202a-b. An external source of power for the OS dongle 250 can be connected to the power connector 256 (power receptacle or power plug).

For example, in some implementations, a length 32 of the OS dongle 250 can be approximately 80 mm (e.g., between 75 mm and 85 mm). A width 30 of the OS dongle 250 can be approximately 55 mm (e.g., between 50 mm and 60 mm). A height 34 of the OS dongle 250 can be approximately 12 mm (between 7 mm and 17 mm). In some implementations, the height 34 of the OS dongle 250 can be dependent on the height 26 and/or the height 28 of the connector 170 and the connector 178, respectively.

FIG. 2C is a diagram of the example OS dongle 200 connected to (interfaced with) a shell computing device 220 using the connector 204. Though not shown, the example OS dongle 250 can also be connected to (interfaced with) the shell computing device 220 using the connector 170. The shell computing device 220 can include a display device 234 in a housing 232. The shell computing device 220 may not include a main PCB that can include, for example, a CPU, communication controller, and memory. In the example shown in FIG. 2B, the shell computing device 220 can be a shell display device (e.g., a television, a monitor)

Other examples of a shell computing devices can include but are not limited to a shell laptop computing device, a shell tablet computing device, a shell smartphone device, a shell notebook computing device, and a shell digital frame device. Each shell computing device can be included in a housing and can have a form factor for the type of computing device, however, the shell computing device lacks a main PCB that can include, for example, a CPU, communication controller, and memory. A shell laptop computing device will be described with reference to FIGS. 6A-B. A shell tablet computing device will be described with reference to FIG. 7A.

For example, a shell smartphone device can be included in a smartphone housing or enclosure, can have a form factor for a smartphone, but will not include a main PCB that can include, for example, a CPU, communication controller, and memory. The shell smartphone device lacks the main control or "brains" needed for the smartphone to be fully functional. For example, a shell notebook computing device can be included in a notebook computer housing or enclosure, can have a form factor for a notebook computer, but will not include a main PCB that can include, for example, a CPU, communication controller, and memory. The shell notebook computing device lacks the main control or "brains" needed for the notebook computing device to be fully functional. For example, a shell digital frame device can be included in a digital frame housing or enclosure, can have a form factor for a digital frame, but will not include a main PCB that can include, for example, a CPU, communication controller, and memory. The digital frame device lacks the main control or "brains" needed for the digital frame device to be fully functional.

The OS dongle 200 remains external to the shell computing device 220 while connected to a connector 222 included in the shell computing device 220. An external source of power for the OS dongle 200 can be connected to the power connector 206 (power receptacle or power plug).

The connector 204 can be a connector, receptacle, or port. In some implementations, as shown in FIGS. 2A-D, the connector 204 can be a male connector that can connect to, interface with, plug into or mate with a female connector (receptacle) (e.g., the connector 222) included in the shell computing device 220. In some implementations, the connector 204 can be a female connector (receptacle) that can connect to, interface with, plug into or mate with a male connector (e.g., the connector 222) that can be included in the shell computing device 220.

In some implementations, the main PCB card 100 can be connected to (interfaced with) the shell computing device 220. In these implementations, the shell computing device 220 can include a slot that can accommodate the main PCB card 100 allowing the main PCB card 100 to be included in (be placed inside of) the shell computing device 220.

FIG. 2D is a diagram that illustrates a detailed view of the example OS dongle 200 connected to (interfaced with) the shell computing device 220 using the connector 204. As shown in FIG. 2D, in many cases, a side 208 of the OS dongle 200 can be near flush with a side 224 of the shell computing device 220. For example, a distance 25 between the side 224 of the shell computing device 220 and the side 208 of the OS dongle 200 can be approximately 2.5 mm (e.g., between 2.0 mm and 3.0 mm).

Referring to FIGS. 2A-D, a first distance 21 between the side 208 of the OS dongle 200 and a first side 210 of the first communication connector 202a can be determined such that when a connector is plugged into (interfaced with) the first communication connector 202a, a housing surrounding the connector may not go beyond the side 208 of the OS dongle 200. For example, this can ensure that a cable that includes the connector and housing at one end can be easily plugged into (interfaced with) the first communication connector 202a without interfering with (coming in contact with) the side 224 of the shell computing device 220. For example, the first distance 21 can be approximately 7.5 mm (e.g., between 7.0 mm and 8.0 mm).

Referring to FIGS. 2A-D, a second distance 23 between a second side 212 of the first communication connector 202a and a first side 214 of the second communication connector 202b can be determined such that when a first connector is plugged into (interface with) the first communication connector 202a and a second connector is plugged into (interfaced with) the second communication connector 202b, a first housing surrounding the first connector may not interfere with (come in contact with) a second housing surrounding the second connector. This can ensure that the first connector with the first housing can be easily plugged into (interfaced with) the first communication connector 202a without interfering with (coming in contact with) a second housing surrounding the second connector that may be plugged into (interfaced with) the second communication connector 202b (and vice versa). For example, the second distance 23 can be approximately 7.5 mm (e.g., between 7.0 mm and 8.0 mm).

In some implementations, the OS dongle 200 can be connected to the shell computing device 220 using a cable. The cable can include a first connector at a first end that properly mates with the type of connector (receptacle) for the connector 204 and a second connector at a second end that properly mates with the type of connector (receptacle) for the shell computing device 220 (e.g., the connector 222).

Figure 3:
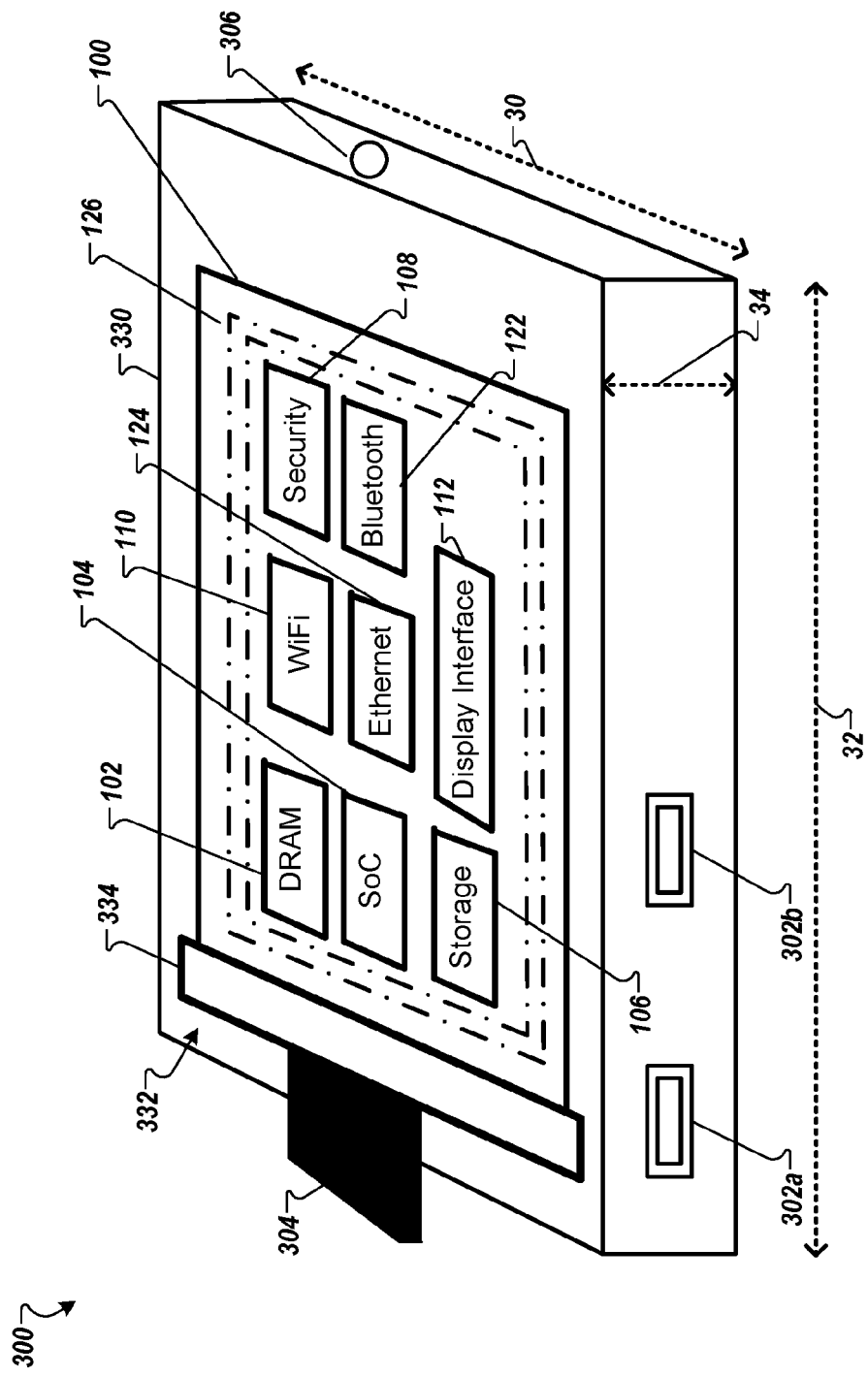
FIG. 3 is a diagram of an example operating system dongle that includes a main PCB card in an enclosure that forms the operating system dongle.

FIG. 3 is a diagram of an example operating system (OS) dongle 300 that includes a main PCB card (e.g., the main PCB card 100) in an enclosure 330 that forms the OS dongle 300. The enclosure 330 can be similar to the enclosure 230 for the OS dongle 200 as shown in FIGS. 2A-C. The OS dongle 300 includes communication connectors 302a-b and a power connector 306. An external source of power for the OS dongle 300 can be connected to the power connector 306 (power receptacle or power plug).

An interface connector 332 can include a first connector 304 and a second connector 334. The first connector 304 can be similar to, and can function in the same manner as, the connector 204 as shown in and described with reference to FIGS. 2A-C. The second connector 334 can connect to (interface with) the connector 114 as shown in and described with reference to FIG. 1A. In this manner, the main PCB card 100 can be included in an enclosure 330 that includes the first connector 304 that can connect to (interface with) a connector included on a shell computing device.

The first connector 304 can be a connector, receptacle, or port. In some implementations, the first connector 304 can be a male connector that can connect to, interface with, plug into or mate with a female connector (receptacle) included in a shell computing device. In some implementations, the first connector 304 can be a female connector (receptacle) that can connect to, interface with, plug into or mate with a male connector that can be included in a shell computing device.

For example, the first connector 304 can be a USB C-type connector (receptacle) that can interface with/connect to a USB C-type receptacle (connector) included in a shell computing device. The OS dongle 300 can interface with the shell computing device using a USB protocol compatible with the USB C-type connector (receptacle) (e.g., USB 3.0, USB 3.1). The first connector 304 can provide DisplayPort signals to the shell computing device, can communicate with the shell computing device using one or more types of USB communication protocols, and the shell computing device can provide power to the main PCB card 100 connected to the interface connector 332.

As described with reference to FIG. 1A, the main PCB card 100 can have a width 10, a length 12, and a height (thickness) 14. A length 32 of the OS dongle 200 can be determined, in part, on the length 12 of the main PCB card 100. A width 30 of the OS dongle 200 can be determined, in part, on the width 10 of the main PCB card 100. A height 34 of the OS dongle 200 can be determined, at least in part, by one or more of a height (thickness) 14 of the main PCB card 100, a height 46 of communication connectors 302a-b (first communication connector 302a and second communication connector 302b) and a height 48 of the first connector 304.

Referring to FIG. 1A, the example main PCB card 100 can be placed inside of a shell computing device. The shell computing device can provide the necessary thermal solution for the main PCB card 100. For example, cooling devices, techniques, and/or components utilized by and included in the shell computing device can be used to help maintain the appropriate thermal operating point of the main PCB card 100. For example, the shell computing device can include one or more fans that can provide forced-air cooling. Examples of other types of cooling can include, but are not limited to, conduction cooling, convection cooling, radiant cooling, and liquid cooling. For example, when the main PCB card 100 is plugged into (interfaced with) the shell computing device, the main PCB card 100 can contact a heat sink or cold plate included in the shell computing device. The heat sink or cold plate can conduct heat away from the main PCB card 100 included in the main PCB card 100. For example, natural convention cooling utilizes natural airflow surrounding and contacting the main PCB card 100 to cool the main PCB card 100 included in the main PCB card 100. For example, radiant cooling involves the transfer of heat by electromagnetic radiation (energy waves) that flow from a hot object to a cooler object. Radiant cooling can transfer heat from the main PCB card 100 to the shell computing device. In this example, the shell computing device may incorporate one or more ways of cooling that can then be used to cool the shell computing device. For example, the shell computing device can include a liquid cooling system that can maintain the shell computing device at an appropriate thermal operating point.

In some implementations, the shell computing device including the main PCB card 100 can incorporate multiple types of cooling devices, techniques and components to maintain the appropriate thermal operating point for the main PCB card 100. In addition, the shell computing device including the main PCB card 100 can incorporate multiple types of cooling devices, techniques and components to maintain the appropriate thermal operation point of the peripherals and other components included in the shell computing device.

Referring to FIGS. 2A-D, the OS dongle 200 can include and provide the necessary thermal solution for the components included in OS dongle 200. The thermal solution can incorporate one or more of the techniques described for the thermal cooling of the main PCB card 100 as described herein. For example, the OS dongle 200 can include one or more fans that can provide forced-air cooling. Examples of other types of cooling can include, but are not limited to, conduction cooling, convection cooling, radiant cooling, and liquid cooling.

Referring to FIG. 3, the OS dongle 300 can include and provide the necessary thermal solution for the main PCB card 100 incorporated into the enclosure 330 for the OS dongle 300 and for any additional components and devices included in the OS dongle 300. The thermal solution can incorporate one or more of the techniques described for the thermal cooling of the main PCB card 100 as described herein. For example, the OS dongle 300 can include one or more fans that can provide forced-air cooling. Examples of other types of cooling can include, but are not limited to, conduction cooling, convection cooling, radiant cooling, and liquid cooling.

Referring to FIGS. 2A-D, in some implementations the height 29 of the communication connectors 202a-b can determine the height 24 of the OS dongle 200 (and specifically the enclosure 230). In some implementations, the communication connectors 202a-b can be removed from (eliminated from, not included in) the OS dongle 200. The removal of the communication connectors 202a-b can result in the determination of the height 24 of the enclosure 230 (and the OS dongle 200) being based on one or more of the height 27 of the connector 204 and a height of one or more components included in the OS dongle 200.

Referring to FIG. 3, in some implementations the height 26 of the communication connectors 302a-b can determine the height 34 of the OS dongle 300 (and specifically the enclosure 330). In some implementations, the communication connectors 302a-b can be removed from (eliminated from, not included in) the OS dongle 300. The removal of the communication connectors 302a-b can result in the determination of the height 34 of the enclosure 330 (and the OS dongle 300) being based on one or more of the height 48 of the first connector 304 and a height 14 of the main PCB card 100.

In some implementations, referring to FIG. 3, the interface connector 332 can be connected to the main PCB card 100 and inserted into a shell computing device in the same manner as the main PCB card 100 would be inserted into a shell computing device. In these implementations, for example, the first connector 304 can be a USB C-type connector that could interface with/connect to a USB C-type connector included in the shell computing device. Use of the USB C-type connector can allow the main PCB card 100 to receive power from the shell computing device as well as allow the main PCB card 100 to provide DisplayPort data to the shell computing device. In addition, the main PCB card 100 and the shell computing device can communicate using one or more types of USB communication protocols as described herein.

Figure 4:
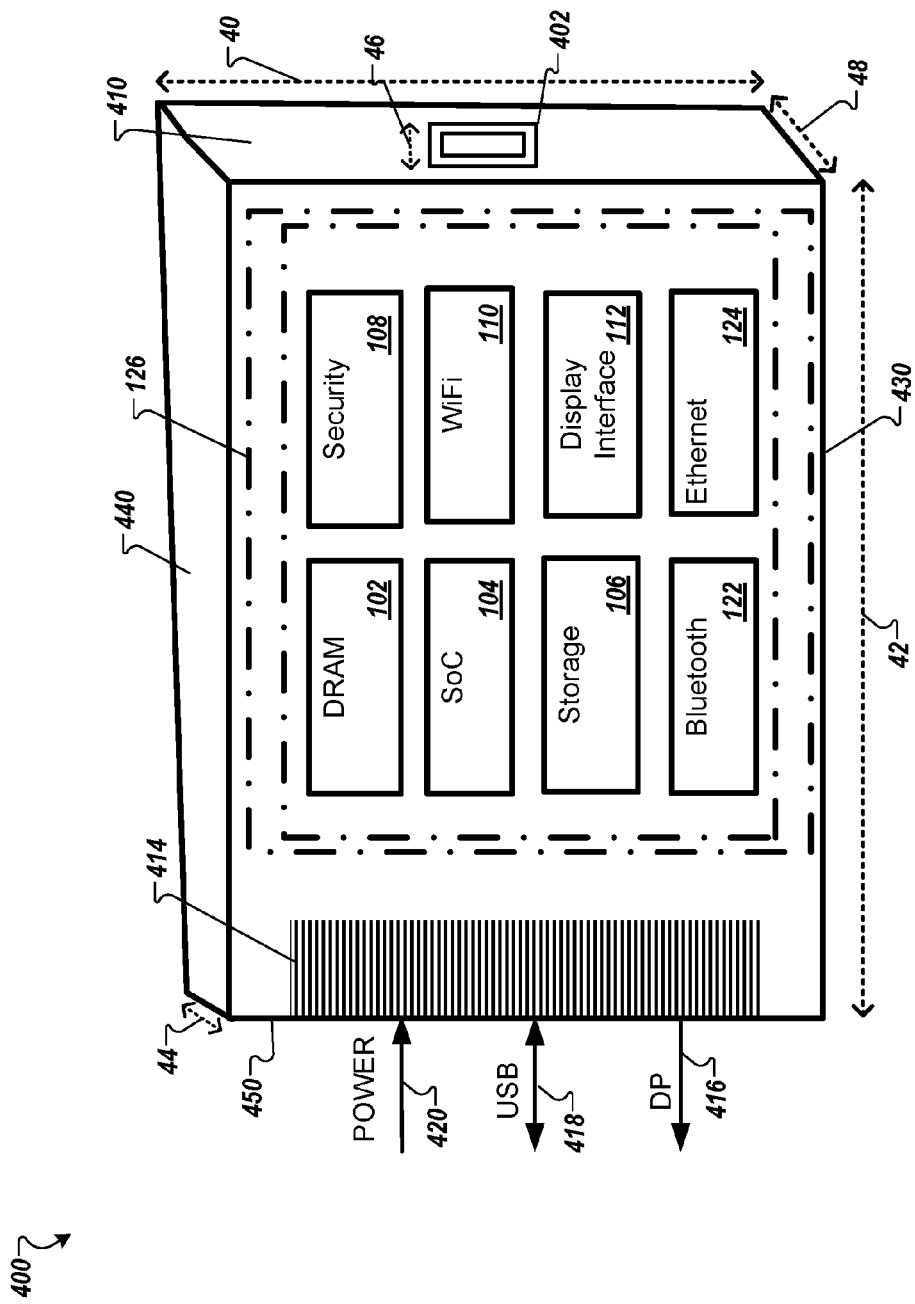
FIG. 4 is a diagram of an example main printed PCB card that includes a communication connector on a side of the main PCB card.

FIG. 4 is a diagram of an example main PCB card 400 that includes a communication connector 402 on a side (edge) 410 of the main PCB card 400. The main PCB card 400 can include the same components as included in the main PCB card 100 as shown in FIG. 1A (e.g., the DRAM 102, the SoC 104, the storage 106, the Bluetooth communication module 122, the WiFi communication module 110, the security module 108, the Ethernet communication module 124, and the display interface module 112).

The main PCB card 400 can have a width 40 and a length 42. In some implementations, the width 40 of the main PCB card 400 can be the same as the width 10 of the main PCB card 100. In some implementations, the length 42 of the main PCB card 400 can be the same as the length 12 of the main PCB card 100.

In some implementations, a height of the main PCB card 400 can be determined based on a height 46 of the communication connector 402. In some implementations, the height of the main PCB card 400 can vary dependent on the height 46 of the communication connector 402 and a component height. The component height can be defined as a distance from the PCB including the component to the top of the component when mounted on the PCB. For example, a height of the SoC 104, a height of DRAM components included in the DRAM 102, a height of memory components included in the storage 106, a height of components included in the security module 108, a height of components included in the WiFi communication module 110, a height of components included in the display interface module 112, and a height of components included in the Ethernet communication module 124 can determine the height 44 of the main PCB card 400. In cases where the height of the components is less than the height 46 of the communication connector 402, a height (a second end height 48) of the main PCB card 400 can be greater at the shat includes the communication connector 402 than a height (a first end height 44) of the main PCB card 400 at a side 450 that includes a connector 414.

Though the example main PCB card 400 includes a communication connector 402 on the side 410 of the main PCB card 400, in some implementations, the main PCB card 400 can include more than one (two or more) communication connectors on the side 410 of the main PCB card 400. In some implementations, one or more communication connectors similar to the communication connector 402 can be included on a side 430 and/or a side 440 of the main PCB card 400. In these implementations, in some cases, the height of the main PCB card 400 may be the same for th16200. In some cases, the height of the main PCB card 400 may be varied such that the height of the main PCB card 400 is greater along the side that includes the one or more connectors and less at a side that does not include the one or more connectors.

For example, the connector 414 can be a male connector that includes gold fingers that interface with power connections 420, communication connections 418 (e.g., USB), and display signal connections 416 (DisplayPort) for use by the shell computing device. The communication connector 402 can be a USB type-C female connector that allows external connections to the main PCB card 400.

Figure 5:
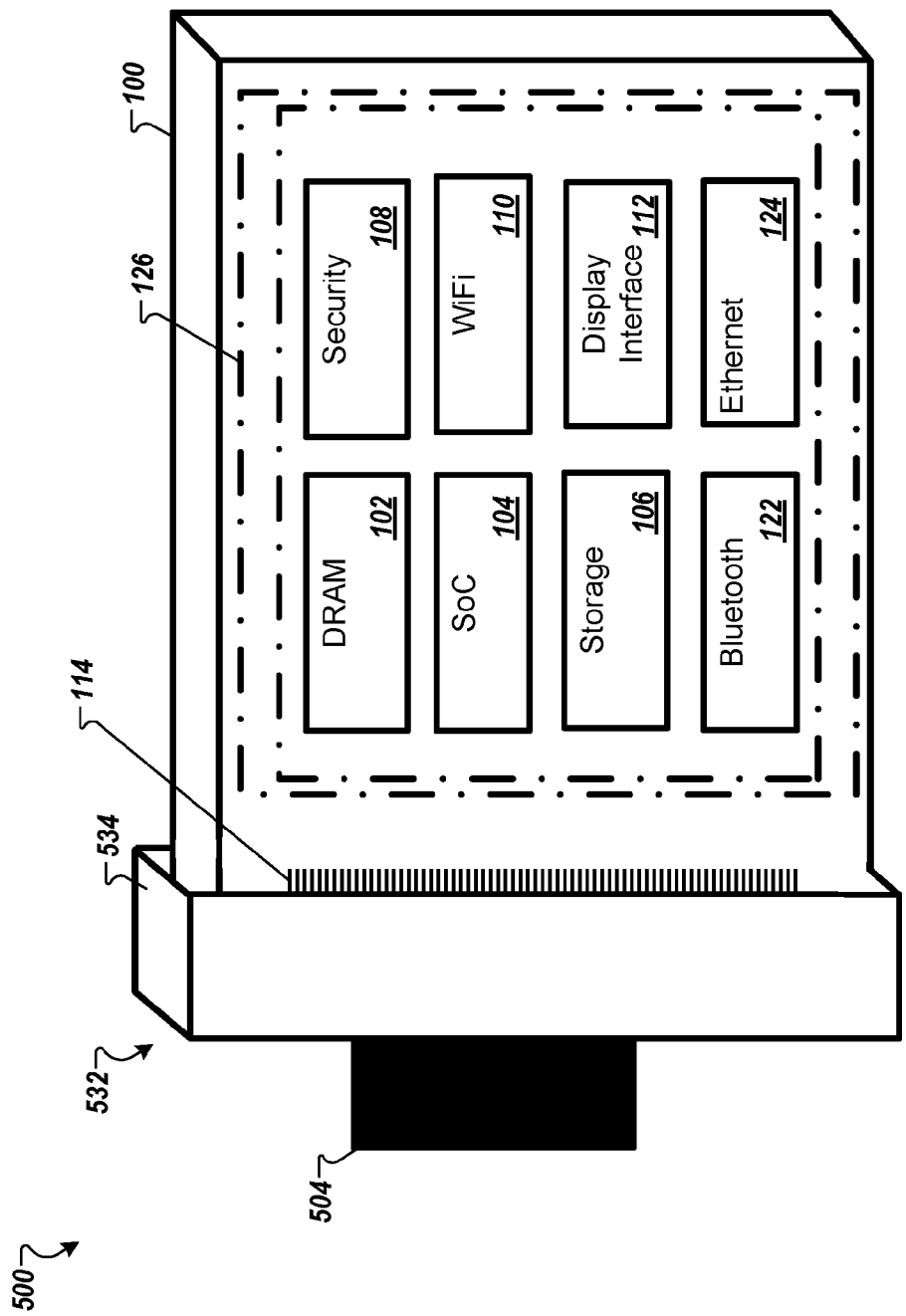
FIG. 5 is a diagram of an example modified main PCB card that can be plugged into an interface connector.

FIG. 5 is a diagram of an example modified main PCB card 500 that can be the example main PCB card 100, as shown in FIG. 1A, plugged into (interfaced with) an interface connector 532. The interface connector 532 includes a first connector 504 and a second connector 534. The first connector 504 can be similar to, and can function in the same manner as, the connector 304 as shown in and described with reference to FIG. 3. The second connector 534 can connect to (interface with) the connector 114 as shown in and described with reference to FIG. 1A. The main PCB card 100 including the interface connector 532 can be plugged into (interfaced with) a shell computing device for inclusion inside of the shell computing device.

For example, the first connector 504 can be a USB C-type connector (receptacle) that can interface with/connect to a USB C-type receptacle (connector) included in a shell computing device. The main PCB card 100 can interface with the shell computing device using a USB protocol compatible with the USB C-type connector (receptacle) (e.g., USB 3.0, USB 3.1).

Figure 6A:
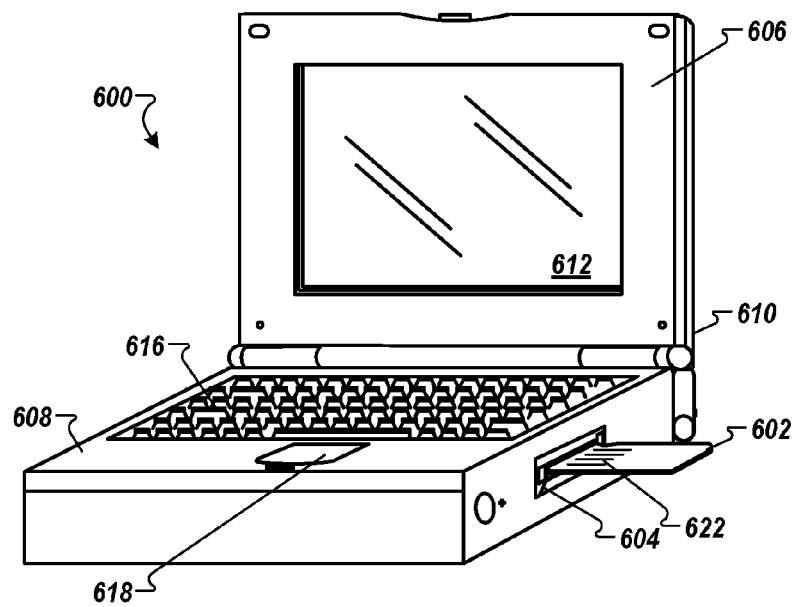
FIG. 6A is a diagram of an example shell laptop computing device that includes a main PCB card.

FIG. 6A is a diagram of an example shell laptop computing device 600 that includes a main PCB card 602. For example, the main PCB card 602 can be the main PCB card 100, the main PCB card 150, the main PCB card 400, or the modified main PCB card 500. As shown in FIG. 6A, the main PCB card 602 can be inserted into the shell laptop computing device 600 by way of a slot 604 that can accommodate the main PCB card 602. A connector 622 can plug into (mate) with a connector included in the shell laptop computing device 600. The shell laptop computing device 600 can include a display component 606 that includes a display device 612. The display component 606 can be integrated with an input component 608. The display component 606 and input component 608 can be housed in an enclosure 610.

As shown, the shell laptop computing device 600 is included in the laptop computer housing (e.g., the enclosure 610), has a form factor for a laptop computer, but does not include a main PCB that can include, for example, a CPU, communication controller, and memory. The shell laptop computing device 600 lacks the main control or "brains" needed for the laptop computing device to be fully functional. The main PCB card 602 when inserted into the shell laptop computing device 600 by way of the slot 604 and plugged into the connector included in the shell laptop computing device 600 provides the main control or "brains" for the functioning of the shell laptop computing device 600.

Figure 6B:
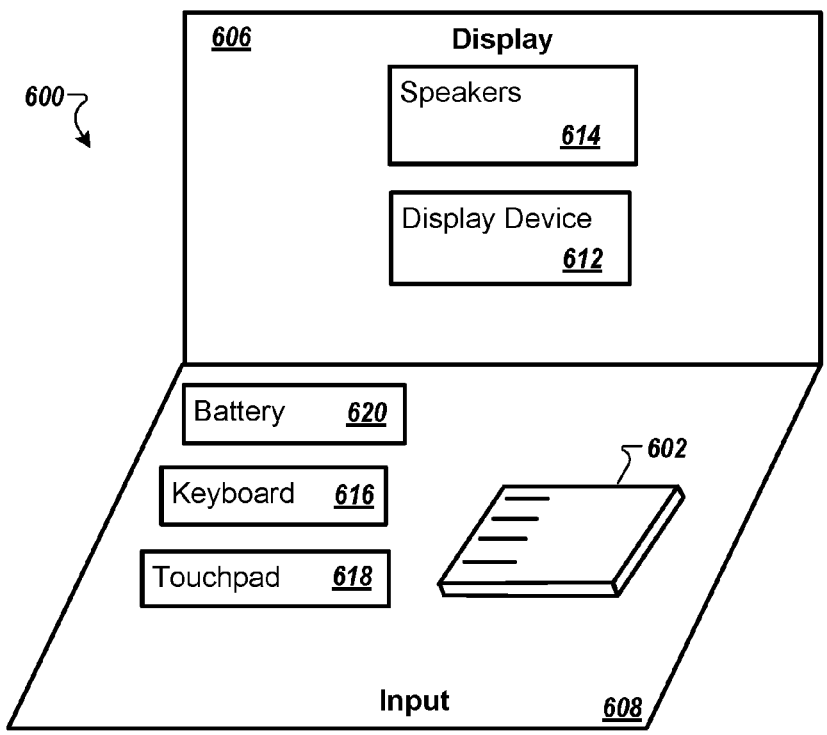
FIG. 6B is a diagram of the example shell laptop computing device that shows components and the main PCB card included in the shell laptop computing device.

FIG. 6B is a diagram of the example shell laptop computing device 600 that shows components and the main PCB card 602 included in the shell laptop computing device 600. The display device 612 can be an output device that is included in the display component 606. The shell laptop computing device 600 can include one or more speakers 614 as additional output devices.

The shell laptop computing device 600 can include a keyboard 616 as an input device along with a trackpad 618. In some implementations, the trackpad 618 can be a touchpad. In some implementations, the display device 612 can be a touchscreen device that can provide input to the shell laptop computing device 600. The keyboard 616 and trackpad 618 are included in the input component 608. The shell laptop computing device 600 can include a battery 620. The shell laptop computing device 600 can include hardware needed to interface with the display device 612, the one or more speakers 614, the keyboard 616, the trackpad 618, and the battery 620.

As described herein for the main PCB card 100, the main PCB card 602 can provide power connections, communication connections, and display signal connections for use by the shell laptop computing device 600. The main PCB card 602 can provide the main control or "brains" to the shell laptop computing device 600. The main PCB card 602 can interface with and control the display device 612, the speakers 614, the keyboard 616, the trackpad 618, and the battery 620. In some implementations, the shell laptop computing device 600 may include fewer, more, or different parts and components than those shown in the example shell laptop computing device 600 shown in FIGS. 6A-B.

Figure 7:
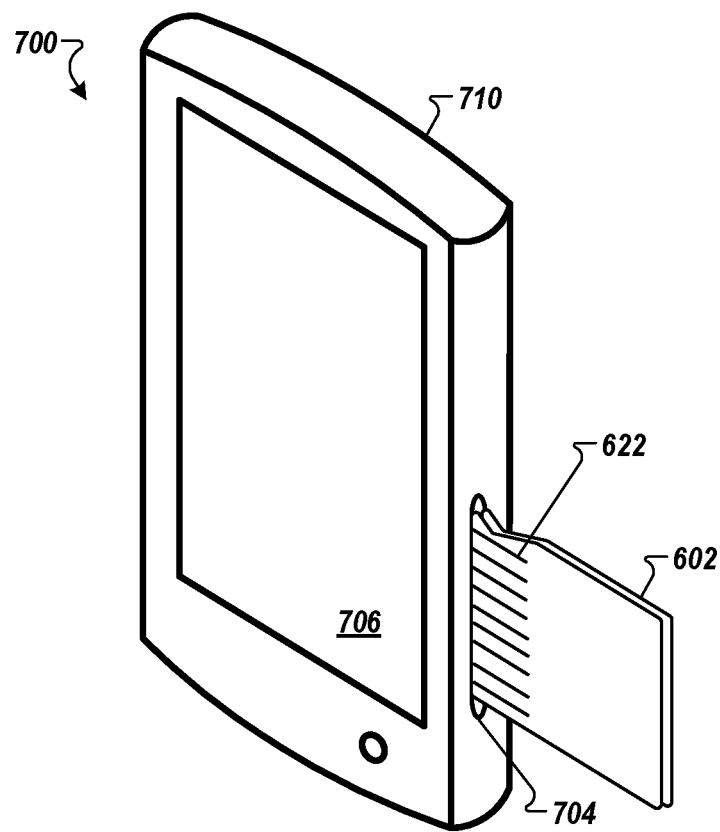
FIG. 7 is a diagram of an example shell tablet computing device that includes the main PCB card.

FIG. 7 is a diagram of an example shell tablet computing device 700 that includes the main PCB card 602. For example, the main PCB card 602 can be the main PCB card 100, the main PCB card 150, the main PCB card 400, or the modified main PCB card 500. As shown in FIG. 7, the main PCB card 602 can be inserted into the shell tablet computing device 700 by way of a slot 704 that can accommodate the main PCB card 602. Once inserted into the slot 704, the main PCB card 602 is incorporated into and fully enclosed by the shell tablet computing device 700. The connector 622 can plug into (mate) with a connector included in the shell tablet computing device 700. The main PCB card 602 is then included inside of the shell tablet computing device 700.

As shown, the shell tablet computing device 700 is included in the tablet computer housing (e.g., an enclosure 710), has a form factor for a tablet computer, but does not include a main PCB that can include, for example, a CPU, communication controller, and memory. The shell tablet computing device 700 lacks the main control or "brains" needed for the tablet computing device to be fully functional. The main PCB card 602 when inserted into the shell tablet computing device 700 by way of the slot 704 and plugged into the connector included in the shell tablet computing device 700 provides the main control or "brains" for the functioning of the shell tablet computing device 700. The main PCB card 602 can interface with and control components included in the shell tablet computing device 700 such as the display device 706.

Figure 10:
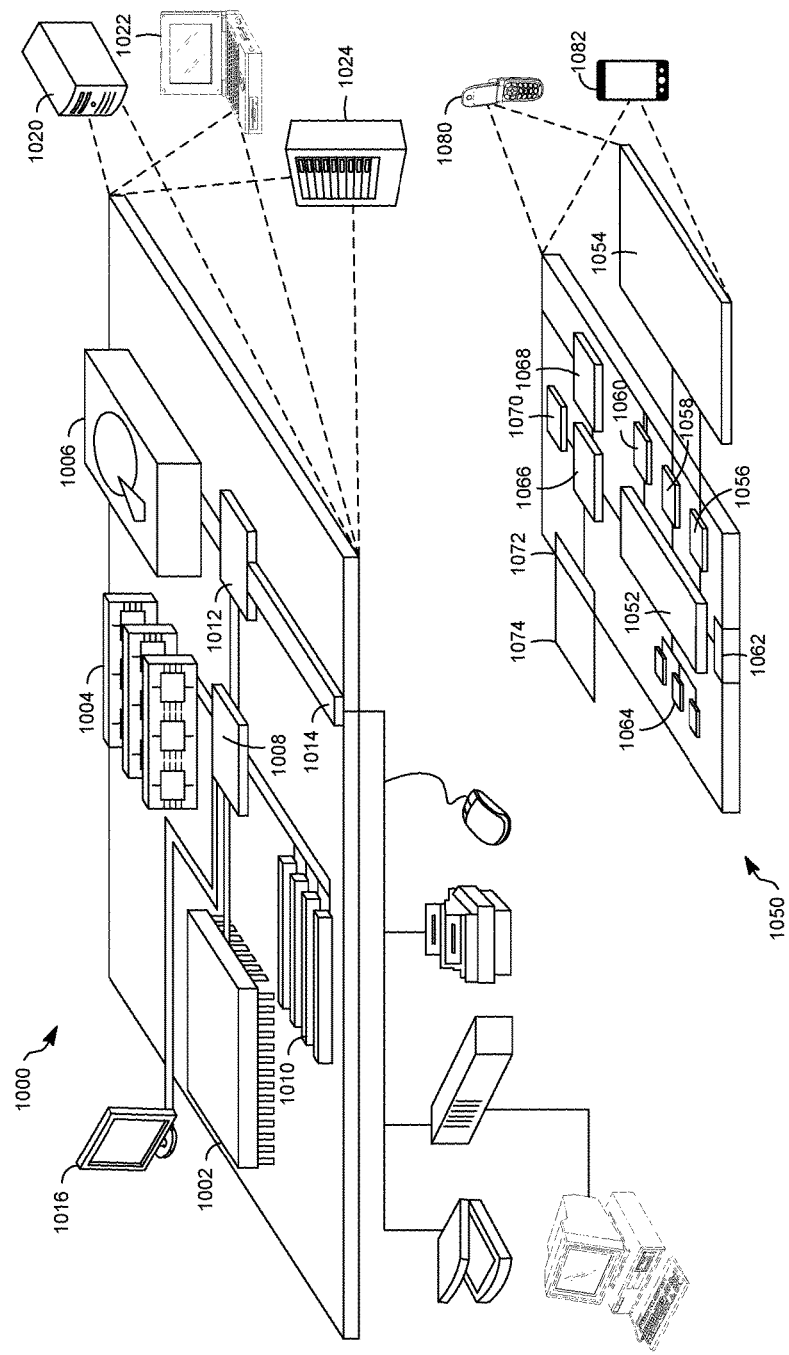
FIG. 10 shows an example of a computer device and a mobile computer device that can be used to implement the techniques described here.

Though not specifically shown, a main PCB card (e.g., the main PCB card 602) can also be included in a shell smartphone device or other type of cellular telephone examples of which are shown in FIG. 10 (e.g., smart phone 1082 and cellular telephone 1080) and that are described herein. The main PCB card can be plugged into (interfaced with) the shell smartphone device or other type of cellular telephone in a similar manner as the main PCB card 602 is inserted into and integrated with the shell tablet computing device 700. The main PCB card can provide the main control or "brains" to the shell smartphone device or other type of cellular telephone. The main PCB card can interface with and control components included in the shell smartphone device, or other type of cellular telephone, such as, for example, a display device.

Though not specifically shown, a main PCB card (e.g., the main PCB card 602) can be included in a shell digital frame device as previously described herein. The main PCB card can be plugged into (interfaced with) the shell digital frame device in a similar manner as the main PCB card 602 is inserted into and integrated with the shell tablet computing device 700. The main PCB card can provide the main control or "brains" to the shell digital frame device. The main PCB card can interface with and control components included in the shell digital frame device such as, for example, a display device.

Figure 8:
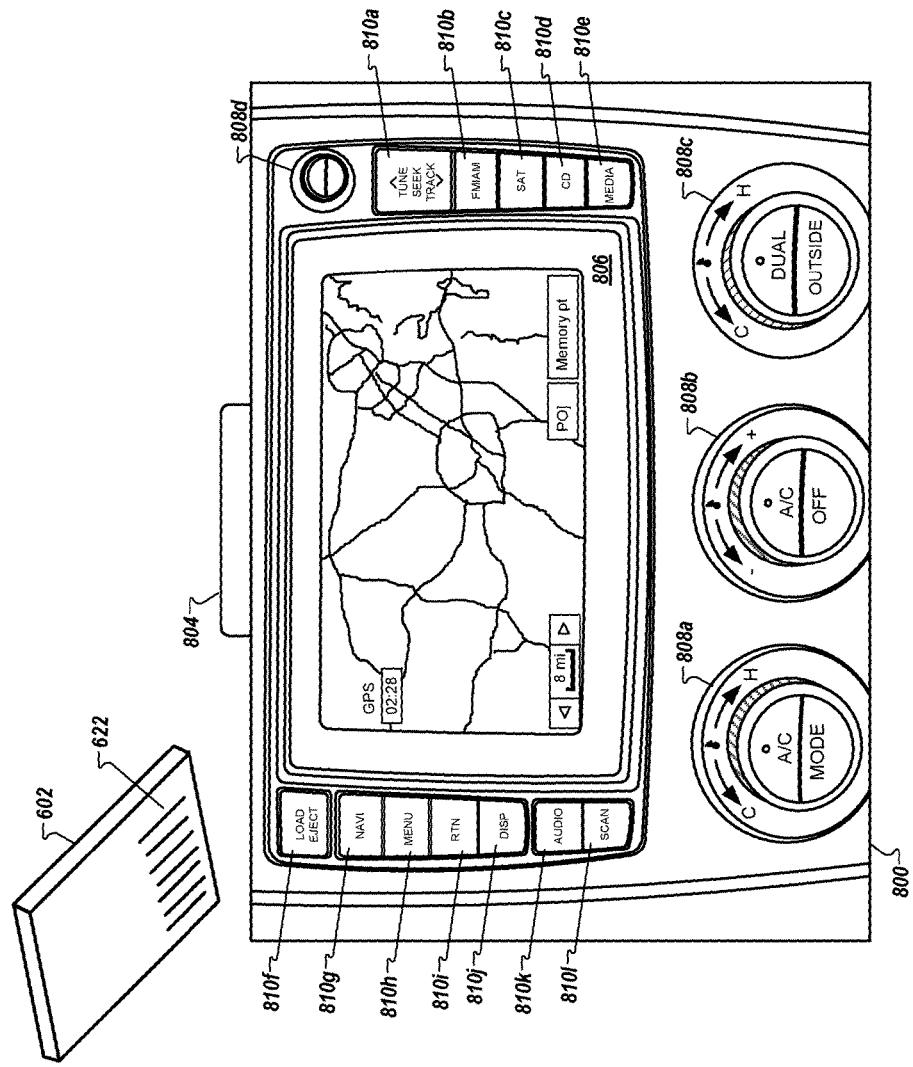
FIG. 8 is a diagram of an example shell navigation system that includes the main PCB card.

FIG. 8 is a diagram of an example shell navigation system 800 that includes the main PCB card 602. For example, the shell navigation system 800 can be included in a dashboard of an automobile and may not include a main PCB that can include, for example, a CPU, communication controller, and memory. The shell navigation system 800 lacks the main control or "brains" needed for the shell navigation system 800 to be fully functional. For example, the main PCB card 602 can be the main PCB card 100, the main PCB card 150, the main PCB card 400, or the modified main PCB card 500. As shown in FIG. 8, the main PCB card 602 can be inserted into the shell navigation system 800 by way of a slot 804 that can accommodate the main PCB card 602. Once inserted into the slot 804, the main PCB card 602 is incorporated into and fully enclosed by the shell navigation system 800. The connector 622 can plug into (mate) with a connector included in the shell navigation system 800. The main PCB card 602 is then included inside of the shell navigation system 800. The main PCB card 602 can provide the main control or "brains" to the shell navigation system 800. The main PCB card 602 can interface with, receive input from, and otherwise control components included in the shell navigation system 800 such as a display device 806, knobs 808a-d, and buttons 810a-l. In addition, the main PCB card 602 can include navigation information for use by the shell navigation system 800.

For example, referring to FIGS. 1, 2A-D, 3, 4, 5, 6A-B, 7, and 8, the same main PCB card can be plugged into and interfaced with multiple different shell computing devices. A user can leverage the use of a single main PCB card for use in the multiple devices. As described herein, in some implementations, the main PCB card can be enclosed inside of the shell computing device. In some implementations, the main PCB card can be included in an enclosure. The main PCB card in the enclosure can be externally connected to a shell computing device. Because the same main PCB card can be incorporated into multiple shell computing devices of a user, updating the main PCB card effectively provides an update to each shell computing device that can incorporate and use the main PCB card.

For example, referring to FIG. 2C and FIG. 4, the main PCB card 400 can be plugged into (interfaced with) the shell computing device 220 (e.g., a television). The communication connector 402 can allow a user to connect an extension or peripheral device (e.g., a webcam) to the main PCB card 400 and therefore to the shell computing device 220. The connection can be a USB C-type connection that is capable of supporting the bandwidth and data transfer speeds needed to handle raw video data. For example, a user can implement a video chat using the shell computing device 220.

Figure 9:
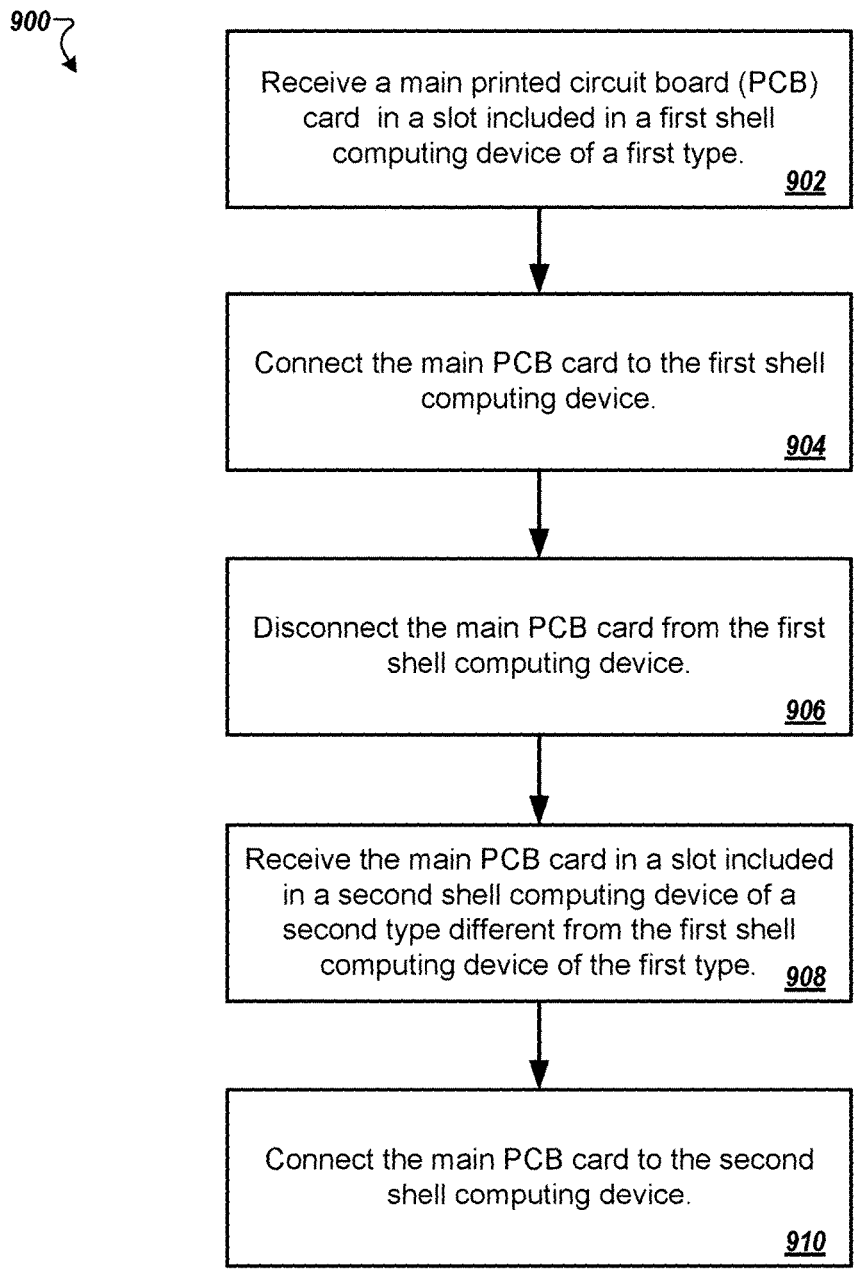
FIG. 9 is a flowchart that illustrates a method for interchangeably interfacing a main PCB card with multiple different types of shell computing devices.

FIG. 9 is a flowchart that illustrates a method 900 for interchangeably interfacing a main PCB card (e.g., the main PCB card 100) with multiple different types of shell computing devices. In some implementations, the systems described herein can implement the method 900. For example, the method 900 can be implemented by the apparatus and systems included in FIGS. 1, 4, 5, 6A-B, 7, and 8.

A main printed circuit board (PCB) card can be received in a slot included in a first shell computing device of a first type (block 902). For example, the main PCB card can be the main PCB card 602 as shown in FIGS. 6A-B. The main PCB card 602 can be received in the slot 604 included in the shell laptop computing device 600. The main PCB card 602 (which can be the main PCB card 100 as shown in more detail in FIG. 1A) can include a SoC (e.g., the SoC 104) configured to run an operating system (OS) in the first shell computing device (e.g., the shell laptop computing device 600) and on the main PCB card 602. The first shell computing device can be of a first form factor representative of a first type of computing device.

The main PCB card can be connected to the first shell computing device (block 904). The connecting of the main PCB card to the first shell computing device can include mating a first connector included in the main PCB card with a second connector included in the first shell computing device. For example, specifically referring to FIGS. 6A-B, the connector 622 included in the main PCB card 602 can be mated with (connected to, plugged into) a connector included in the shell laptop computing device 600. The connection results in the inclusion of the main PCB card 602 in the shell laptop computing device 600 as shown in FIG. 6B.

The main PCB card can be disconnected from the first shell computing device (block 906). Disconnecting the main PCB card from the first shell computing device includes un-mating (unplugging, disconnecting) the first connector included in the main PCB card from the second connector included in the first shell computing device. The un-mating (unplugging, un-mounting, disconnecting) results in the removal of the main PCB card from the first shell computing device. For example, specifically referring to FIGS. 6A-B, the connector 622 included in the main PCB card 602 can be un-mated with (disconnected from, unplugged from) a connector included in the shell laptop computing device 600. The disconnection allows the main PCB card 602 to be removed from the shell laptop computing device 600 by way of the slot 604. The disconnecting of the main PCB card 602 from the shell laptop computing device 600 results in the removal of the main PCB card 602 from the shell laptop computing device 600.

The main PCB card can be received in a slot included in a second shell computing device of a second type different from the first shell computing device of the first type (block 908). For example, the main PCB card can be the main PCB card 602 as shown in FIG. 7. The main PCB card 602 can be received in the slot 704 included in the shell tablet computing device 700, the shell tablet computing device 700 being of a different type of computing device from the shell laptop computing device 600. The main PCB card 602 (which can be the main PCB card 100 as shown in more detail in FIG. 1A) can include a SoC (e.g., the SoC 104) configured to run an operating system (OS) in the second shell computing device (e.g., the shell tablet computing device 700) and on the main PCB card 602. The second shell computing device can be of a second form factor representative of a second type of computing device that is different from the first type of computing device.

The main PCB card can be connected to the second shell computing device (block 910). The connecting of the main PCB card to the second shell computing device can include mating a first connector included in the main PCB card with a third connector included in the second shell computing device. For example, specifically referring to FIG. 7, the connector 622 included in the main PCB card 602 can be mated with (connected to, plugged into) a connector included in the shell tablet computing device 700. The connection results in the inclusion of the main PCB card 602 in the shell tablet computing device 700.

FIG. 10 shows an example of a generic computer device 1000 and a generic mobile computer device 1050, which may be used with the techniques described here. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A system comprising:
 a main printed circuit board (PCB) card configured to be interchangeably interfaced with multiple types of shell computing devices, wherein a width of the main PCB card is less than forty millimeters, the main PCB card including:
  a card connector;
  a System on a Chip (SoC) configured to run an operating system on the main PCB card; and
  an antenna; and
 a shell computing device of the multiple types of shell computing devices, the shell computing device included in a dashboard of an automobile, the shell computing device including:
  a slot configured to accommodate the main PCB card allowing the main PCB card to be included inside of the shell computing device; and
  a mating connector, the card connector configured to be plugged into the mating connector.

2. The system of claim 1, wherein the main PCB card further includes a radio-frequency transceiver configured to be interfaced to the antenna.

3. The system of claim 1, wherein the main PCB card further includes a WiFi communication module configured to allow the shell computing device to communicate wirelessly with a network.

4. The system of claim 3, wherein the antenna is a WiFi antenna.

5. The system of claim 4, wherein the WiFi communication module is configured to interface with the WiFi antenna.

6. The system of claim 1, wherein the main PCB card further includes:
 at least one dynamic random access memory (DRAM) device configured for use by the SoC; and
 at least one non-volatile memory device configured for use by the SoC.

7. The system of claim 1, wherein the SoC includes circuitry to wirelessly interface the shell computing device to a cellular data network.

8. The system of claim 1, wherein the shell computing device includes a navigation system.

9. A main printed circuit board (PCB) card comprising:
a System on a Chip (SoC) configured to run an operating system (OS) stored on the main PCB card, a width of the main PCB card being less than forty millimeters;
at least one dynamic random access memory (DRAM) device configured for use by the SoC;
at least one non-volatile memory device configured for use by the SoC;
at least one connector; and
an antenna,
the main PCB card being configured to be interfaced with a shell computing device included in a dashboard of an automobile, a slot being configured to accommodate the main PCB card, the at least one connector configured to be plugged into a mating connector included in the shell computing device.

10. The main PCB card of claim 9, further comprising a radio-frequency transceiver configured to be interfaced to the antenna.

11. The main PCB card of claim 9, further comprising a WiFi communication module configured to allow the shell computing device to communicate wirelessly with a network.

12. The main PCB card of claim 11,
wherein the antenna is a WiFi antenna, and
wherein the WiFi communication module is configured to interface with the WiFi antenna.

13. The main PCB card of claim 9, wherein the SoC includes circuitry to wirelessly interface the shell computing device to a cellular data network.

14. The main PCB card of claim 9, wherein the mating connector is included in the shell computing device such that plugging the at least one connector of the main PCB card into the mating connector results in the main PCB card being included inside of the shell computing device.

15. The main PCB card of claim 9, wherein the shell computing device includes a navigation system.

16. A method comprising:
receiving, in a slot included in a shell computing device included in a dashboard of an automobile, a main printed circuit board (PCB) card having a width of less than forty millimeters and including a first connector, a System on a Chip (SoC) configured to run an operating system on the main PCB card, and an antenna;
connecting the main PCB card to the shell computing device, the connecting comprising mating the first connector with a second connector included in the shell computing device; and
subsequent to the connection, enabling wireless communications with the shell computing device by way of the antenna.

17. The method of claim 16, wherein the mating results in the inclusion of the main PCB card inside of the shell computing device.

18. The method of claim 16,
wherein the antenna is a WiFi antenna; and
wherein the main PCB card further includes a WiFi communication module configured to interface with the antenna, wherein enabling wireless communications with the shell computing device includes using the WiFi communication module.

19. The method of claim 16, wherein the SoC includes circuitry to wirelessly interface the shell computing device to a cellular data network.

20. The method of claim 16, wherein enabling wireless communications with the shell computing device by way of the antenna includes using a radio-frequency transceiver.

* * * * *